US012750374B2

(12) United States Patent
Kunda et al.

(10) Patent No.: US 12,750,374 B2
(45) Date of Patent: Sep. 29, 2026

(54) CONTINUOUS ACCESS CONTROL GROUP DETERMINATION

(71) Applicant: Oleria Corporation, Bellevue, WA (US)

(72) Inventors: Jagadeesh Kunda, Southlake, TX (US); James Alkove, Seattle, WA (US); Adarsh Khare, Sammamish, WA (US); Weiqiang Li, Sammamish, WA (US)

(73) Assignee: Oleria Corporation, Bellevue, WA (US)

( * ) Notice: Subject to any disclaimer, the term of this patent is extended or adjusted under 35 U.S.C. 154(b) by 81 days.

(21) Appl. No.: 19/013,264

(22) Filed: Jan. 8, 2025

(65) Prior Publication Data

US 2026/0197319 A1 Jul. 9, 2026

(51) Int. Cl.

| | |
|---|---|
| ***G06F 7/00*** | (2006.01) |
| ***H04L 9/40*** | (2022.01) |
| ***H04L 41/16*** | (2022.01) |

(52) U.S. Cl.

CPC ............ *H04L 63/104* (2013.01); *H04L 41/16* (2013.01); *H04L 63/101* (2013.01)

(58) Field of Classification Search

CPC .... G06F 16/358; G06F 16/148; G06F 16/137; G06F 16/152; G06F 16/56; G06F 16/538; G06F 16/278; G06F 16/256; G06F 16/164; G06F 16/1752; G06F 16/113; G06F 16/35; G06F 16/735; G06F 16/738; G06F 16/7867; G06F 16/214; G06F 16/215; G06F 16/951; G06F 16/2329; G06F 16/9577; G06F 16/953; G06F 16/285; G06F 16/288; G06F 16/2237; G06F 16/9538; G06F 16/9014; G06F 16/338; G06F 16/9535; G06F 16/248; G06F 16/243; G06F 16/26; G06F 16/24522; G06F 16/2255; G06F 16/3347; G06F 16/3344; G06F 16/332; G06F 16/3322; G06F 16/2456;

(Continued)

(56) References Cited

U.S. PATENT DOCUMENTS 8,875,222 B1 * 10/2014 Chang .................. G06F 21/604 726/1
9,639,570 B2 * 5/2017 Wright .................. G06F 16/113

(Continued)

*Primary Examiner* — Mohammad A Sana
(74) *Attorney, Agent, or Firm* — Fenwick & West LLP

(57) ABSTRACT

A data management server may receive metadata related to data access associated with a domain containing a plurality of named entities. The server determines domain-defined groups, each associated with a domain-defined access rule, and extracts features from the metadata, including access activity data of the named entities accessing domain resources. These features are input into a machine learning model to identify an automatically-generated access-control group comprising one or more named entities. The server determines an access control rule for the generated group based on access activity data and compares it to a domain-defined access rule for a domain-defined grouping containing one of the named entities. Based on this comparison, the server generates a recommendation to modify access privileges for one or more named entities in the group, facilitating enhanced access control aligned with domain-specific policies and security objectives.

20 Claims, 15 Drawing Sheets

700

(58) Field of Classification Search
CPC ............. G06F 16/2465; G06F 16/2471; G06F 16/24575; G06F 16/24578; G06F 16/2453; G06F 16/2457; H04L 63/104; H04L 41/16; H04L 63/101; H04L 45/08
See application file for complete search history.

(56) References Cited

U.S. PATENT DOCUMENTS

| | | | | |
|---|---|---|---|---|
| 10,454,934 | B2 * | 10/2019 | Parimi | G06N 20/00 |
| 11,108,780 | B2 * | 8/2021 | Cohen | H04L 63/101 |
| 11,809,581 | B2 * | 11/2023 | Badawy | G06N 3/09 |
| 2015/0381661 | A1 * | 12/2015 | He | H04L 63/105<br>726/1 |
| 2023/0199074 | A1 * | 6/2023 | Amir-Siddiqi | G06N 5/04<br>709/223 |
| 2025/0225264 | A1 | 7/2025 | Khare et al. | |

* cited by examiner

650

700

900

CONTINUOUS ACCESS CONTROL GROUP DETERMINATION

TECHNICAL FIELD

The instant disclosure is related to data management of workspace data sources and computer architecture in data management.

BACKGROUND

In contemporary large enterprises, efficient data management stands as a cornerstone of operational success. The proliferation of digital assets, ranging from sensitive corporate information to customer data, requires robust systems to ensure secure access, integrity, and compliance. However, as enterprises expand in scale and complexity, the challenge of comprehensively understanding and managing access rights for individual users can often emerge as a bottleneck.

The exponential growth of data within large enterprises introduces a myriad of complexities, such as user access rights. In a typical organizational ecosystem, users span various roles, departments, and hierarchical levels, each with distinct privileges and requirements for accessing data. Traditional methods of managing access rights, such as role-based access control, often fall short of adequately addressing the nuanced needs of modem enterprises.

Furthermore, the dynamic nature of organizational structures and evolving regulatory landscapes exacerbate the challenge of maintaining granular control over data access. As employees transition between roles and projects, or leave the organization, ensuring timely adjustments to access permissions becomes a daunting task. This fluidity introduces inherent vulnerabilities, leaving sensitive data susceptible to unauthorized access or inadvertent exposure.

Compounding this complexity are the diverse data sources and repositories scattered across heterogeneous information technology (IT) environments. From on-premises servers to cloud-based platforms, data may reside in different sources. An organization often needs to reconcile the dynamic interplay between user access rights, data repositories, and evolving organizational structures.

The figures depict, and the detailed description describes, various non-limiting embodiments for purposes of illustration only.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

A data management server may optimize access control within an organization by leveraging machine learning models to enhance security and operational efficiency. The server processes metadata related to data access activities, which are associated with individual users within the organization (e.g., users, roles, or applications). The data management server determines domain-defined groups and corresponding access rules while extracting features from the metadata, including patterns of access activity. These features are input into a machine learning model that identifies automatically-generated access-control groups that includes one or more individuals who have similar access profile.

The data management server evaluates access activity data and determines tailored access control rules for the generated groups. These rules are compared to existing access control rules (e.g., permissions granted to the users) to detect discrepancies or inefficiencies. Based on this analysis, the data management server generates actionable recommendations to adjust access privileges for named entities. This iterative process ensures alignment with the principle of least privilege, reduces access redundancies, and strengthens security frameworks.

System Overview

Figure 1:
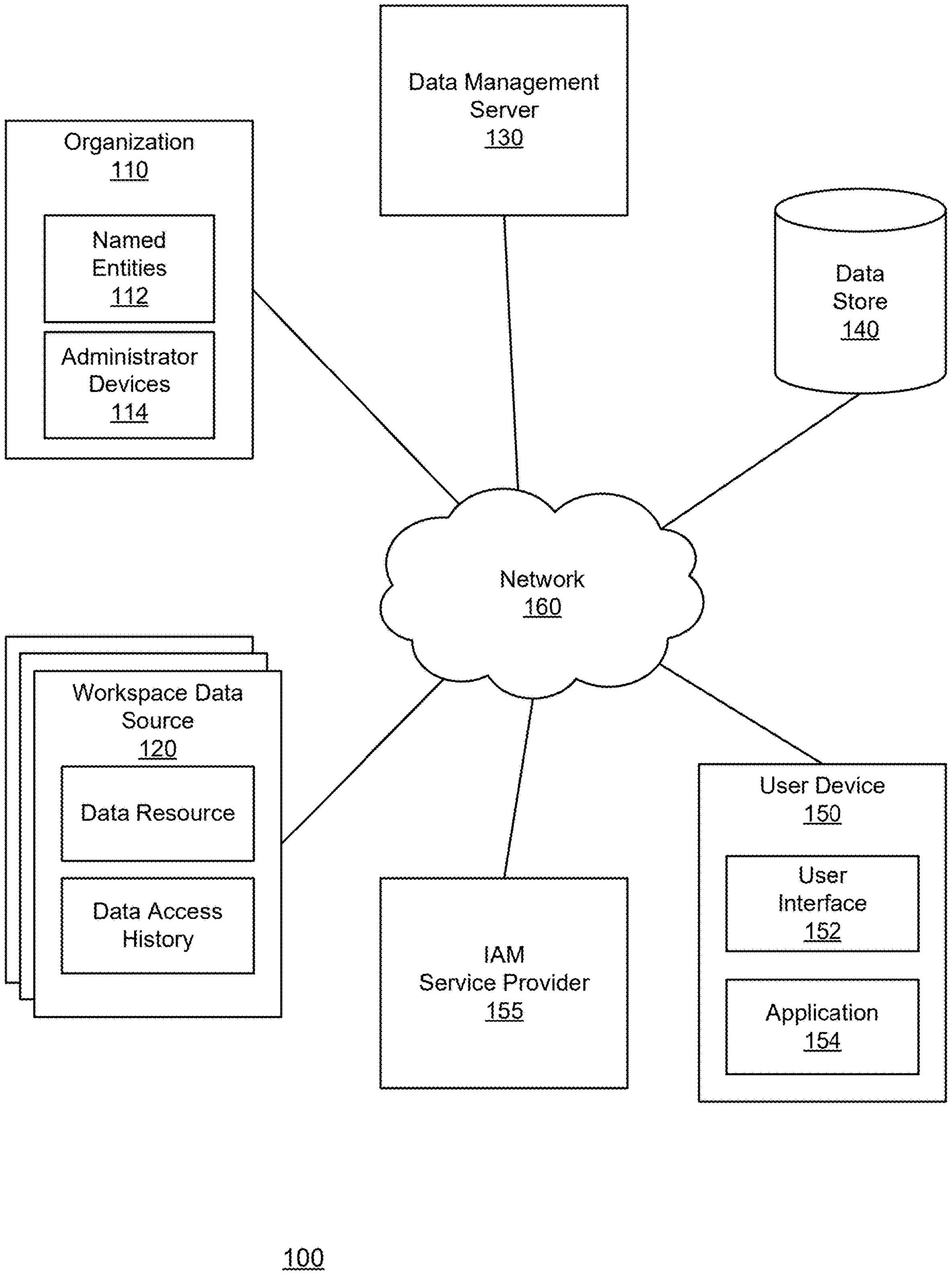
FIG. 1 is a block diagram of a system environment, in accordance with some embodiments.

FIG. 1 is a block diagram that illustrates an example of a system environment 100 for managing data access, in accordance with some embodiments. By way of example, the system environment 100 includes an organization 110, workspace data sources 120, a data management server 130, a data store 140, a user device 150, and an identity access management (IAM) service provider 155. The entities and components in the system environment 100 communicate with each other through network 160. In various embodiments, the system environment 100 may include different, fewer, or additional components.

The components in the execution environment 100 may each correspond to a separate and independent entity or may be controlled by the same entity. For example, in some embodiments, the data management server 130 may control the data store 140. In other embodiments, the data management server 130 and the data store 140 are operated by different entities and the data store 140 provides data storage service to the data management server 130. Likewise, in some embodiments, an organization 110 may control one or more workspace data sources 120, such as in situations where the organization 110 manages part of its own data.

While each of the components in the system environment 100 is sometimes described in disclosure in a singular form, the system environment 100 may include one or more of each of the components. For example, there can be multiple user devices 150 communicating with the data management server 130 and workspace data sources 120. The data management server 130 may provide data access management services to different unrelated organizations 110, each of which has multiple workspace data sources 120. While a component is described in a singular form in this disclosure, it should be understood that in various embodiments, the component may have multiple instances. Likewise, while some of the components are described in a plural form, in some embodiments the component only has a single instance in the system environment 100. For example, in some situations, an organization 110 may use a single workspace data source 120.

An organization 110 may be any suitable entity such as a government entity, a private business, a profit organization or a non-profit organization. An organization 110 may define an application environment in which a group of individuals, devices, and other agents organize and perform activities and exchange information. The system environment 100 may include multiple organizations 110, which may be customers of the data management server 130 that provide various data management-related services to customers, such as data access management, data policy enforcement, etc. An organization 110 may be referred to as a business, a domain, or an application environment, depending on the situation.

By way of example, an organization 110 may also be referred to as a domain. In some embodiments, the terms domain and organization may be used interchangeably. A domain refers to an environment for a group of units and individuals to operate and use domain knowledge to organize activities, enforce policies, and operate in a specific way. An example of a domain is an organization, such as a business, an institute, or a subpart thereof, and the data within it. A domain can be associated with a specific domain knowledge ontology, which could include representations, naming, definitions of categories, properties, logics, and relationships among various concepts, data, transactions, and entities that are related to the domain. The boundary of a domain may not completely overlap with the boundary of a business. For example, a domain may be a subsidiary of a company. Various divisions or departments of the organization may have their own definitions, internal procedures, tasks, and entities. In other situations, multiple businesses may share the same domain. In some embodiments, a domain may also be referred to as a workspace. For example, a business may divide its company into multiple workspaces based on geographical regions, for example, North America, Asia Pacific, Europe, the Middle East and North Africa, Australia and New Zealand, etc. Each workspace may be referred to as a domain.

In some embodiments, an organization 110 may have various types of resources that are under its control. The resources may be directly controlled by the organization 110 within its physical or digital domain or indirectly managed by the organization 110 through one or more workspace data sources 120. Examples of resources may include named entities 112 and administrator devices 114. A named entity 112 may each have one or more accounts that are managed and/or controlled by the organization 110. For example, each employee of an organization 110 may have one or more organizational accounts that have different access rights to various types of data. Sometimes a group of employees (e.g., the legal team, the sales team, the human resource team, etc.) may also be a named entity that has accounts at the group level. The employees and the organizational accounts are both examples of resources that are controlled by the organization 110. A named entity may also correspond to a non-human account (a service account, a machine account, etc.).

Other examples of resources may be data resources, such as datasets that belong to the organization 110. Data can be related to any aspect of the organization 110. In some situations, the organization 110 may directly control the data resources such as having organization-controlled data servers that store the data resources. In other situations, organization 110 may use one or more third-party software platforms such as software-as-a-service (SaaS) platforms that provide services to the organization 110. Organization data may be stored and generated by those third-party platforms. The organization-controlled data servers and third-party software platforms are examples of workspace data sources 120 that manage the data resources of an organization 110.

An organization 110 may implement one or more policies specifying access privilege and data requirements related to data resources of the organization 110. For example, the data access rights to a particular data resource (e.g., a dataset) may be assigned based on the roles, positions, hierarchy, and other natures of named entities 112. Each workspace data source 120 may also have its own data access conditions specific to an organization 110. In many situations, data access rights are changed due to circumstances and special requirements. While oftentimes an organization 110 is aware of certain data access rights and restrictions in place, it is usually challenging for the organization 110 to properly document each data access policy and change, whether such documentation is even practical without a data management server 130. For example, an organization 110 may not have a systematic way to implement data access policies among its employees based on the roles of the employees. There can also be multiple administrator devices that grant or revoke access privileges in various situations, some more systematically while others are ad hoc. This makes an organization 110, particularly a larger one, difficult to understand data access situations of various named entities 112 and manage data accordingly. The data management server 130 provides various solutions to improve the data management of organizations 110.

Named entities 112 associated with an organization 110 may be any suitable entities that are identifiable, such as people, employees, teams, groups, departments, customers, vendors, contractors, other third parties, subsidiaries, and other sub-organizations. A user in the organization 110 is an example of a named entity 112. A user in this context may refer to a regular employee or an administrator of the named entity who takes the role of managing some resources, such as data resources of the organization 110. An administrator controls an administrator device 114. An organization 110 may maintain a hierarchy of named entities, which contains information about the relationships among the named entities. A hierarchy may take the of an organizational chart and employee hierarchy. Data access policies may be determined based on one or more hierarchies maintained by the organization 110. In some embodiments, an administrator, through an administrator device 114, may review data access information and grant or revoke data access privilege through the service provided by the data management server 130. Each named entity 112 may be associated with various activities and history of data use of the data resources of the organization 110.

Workspace data sources 120 are components that maintain and control data for an organization 110. A workplace data source 120 refers to any system, platform, or repository that contains information relevant to an organization's operations, activities, or employees. Workspace data sources 120 may take different forms. An example of a workspace data source 120 may be a data store, such as a data store 140, that stores data of the organization 110. For example, the workspace data source 120 may be a local data server or a Cloud server that stores data directly managed by the organization 110. In another example, a workspace data source 120 may be a software platform that provides service to the organization 110 based on data entered or provided by the organization 110. The software platform may be a software-as-a-service (SaaS) platform that runs software using domain-specific data. In some embodiments, the data may be provided by the organization 110 such as through linking the software platform to a data store 140 that stores the data of the organization 110. In some embodiments, the software platform itself may generate data for the organization 110 and store the data at another data store 140 or through the software platform's servers. In some embodiments, a workspace data source 120 may grant access to data based on access permission.

Workspace data sources 120 may also be referred to as access control systems. An access control system is delegated by an organization customer to control part of the data access of an organization 110 and maintains a data access history of one or more accounts of the organization 110. For example, a SaaS platform is retained by the organization 110 to generate and manage data associated with the organization 110 and may be an example of an access control system m. The SaaS platform provides data based on the data access permission of individual accounts.

In various embodiments, examples of workspace data sources 120 may include human resource systems, such as human resources management systems (HRMS) or human capital management (HCM) platforms that store employee data such as personal information, employment history, performance evaluations, and payroll details. Other examples of workspace data sources 120 may include customer relationship management (CRM) systems, including databases that contain information about clients, customers, or business contacts, including interactions, sales history, and customer preferences. Further examples of workspace data sources 120 may include enterprise resource planning (ERP) systems, such as integrated platforms that manage various aspects of business operations, including finance, supply chain, manufacturing, and inventory, generating data on transactions, orders, and inventory levels. Further examples of workspace data sources 120 may include communication and collaboration tools, such as email servers, instant messaging services, and project management tools where workplace communications and collaborations occur, generating data on interactions, discussions, and project progress. Further examples of workspace data sources 120 may include business intelligence (BI) tools and data warehouses that aggregate and analyze data from multiple sources to generate insights and reports for decision-making purposes. Further examples of workspace data sources 120 may include time tracking and attendance systems, including tools used to record employee working hours, absences, and attendance data. Further examples of workspace data sources 120 may include file storage and document management systems, including repositories for storing documents, reports, and other digital assets generated within the organization. In some embodiments, examples of workspace data sources 120 may further include physical devices such as internet-of-things (IOT) devices that are in the workplace, such as sensors, smart devices, and wearable technology, generating data on environmental conditions, usage patterns, and employee activities.

A workspace data source 120 may maintain the data access history of an organization 110. Forms of data access history in a workspace data source 120 may include records of who accessed specific files or databases, when they accessed them, and for what purpose. These metadata may be maintained in the form of metadata that captures user authentication details, timestamps, and the actions performed during each access instance. User authentication details may include user accounts, roles, or unique identifiers, while timestamps indicate the exact date and time of access. Additionally, the actions performed during access, such as viewing, editing, or deleting files, may be logged to provide records of data interactions. The data access history may also include data permission and authorization history such as when and who grants or revokes data access privilege of a particular named entity 112 to a data resource. Other relevant metadata related to data access may also be stored by the workspace data source 120.

A workspace data source 120 may provide one or more channels to allow the data and data access history maintained by the workspace data sources 120 to be exported to another entity. For example, a workspace data source 120 may offer Application Programming Interfaces (APIs), to facilitate the export of both data and data access history maintained within the workspace to another entity. APIs serve as a structured ways of communication between different software applications, allowing the data management server 130 to receive the data access history upon authorization from an organization 110. APIs may take different forms, such as a Representational State Transfer (REST) API that may take the form of stateless communication method over hypertext transfer protocol (HTTP). Other forms of APIs are also possible, such as GraphQL API with a query language that allows the data management server 130 to specify the desired fields and relationships in the queries. APIs may also include webhooks, which may take the form of HTTP callbacks triggered by events in the workspace data source 120, such as data access events. When data access events or data transfer events occur, a workspace data source 120 may send a notification to the data management server 130. The payload of the notification may contain relevant information about the event, including details of the data access history. Other forms of communication channels between a workspace data source 120 and the data management server 130 may include a file-based exports that periodically export data access history in a structured file format (e.g., JSON or CSV) to a designated location accessible by the data management server 130. In some embodiment, a communication channel may include a database replication or sync to allow the data management server 130 to directly connect to database of the workspace data source 120 for real-time replication or synchronization of data access history. In some embodiments, a communication channel between a workspace data sources 120 and the data management server 130 may take the form of a data stream that allows a continuous flow of data access events or updates from the workspace data source 120. This stream of data typically may include real-time or near-real-time information about various data access activities within the workspace environment, such as user logins, file accesses, modifications, or deletions.

The data management server 130 provides data management service to one or more organizations 110 to oversee and regulate access to data within an organization 110. The data management server 130 may collect data and related metadata such as data access history of various workspace data sources 120 of an organization 110 and provide analysis to the organization 110 with respect to data access, data policy management and compliance, and centralized data administration and monitoring. Workspace data sources 120 often have a large volume of data traffic and may store metadata related to data access in different non-standardized formats. In some embodiments, the data management server 130 may transform the metadata according to a standardized data schema and consolidate the data access information from various workspace data sources 120 into a centralized datastore as objects that are arranged according to the standardized data schema. In some embodiments, the data management server 130, using the standardized and consolidated data objects, may provide various applications and analyses related to data management to the organization 110, such as activity-based composite data access and permission graphs, display and illustration of data access permission and restrictions, automatic access policy generation and determination, convenient grant and revocation of data access, and data access risk assessment. In some embodiments, the data management server 130 may perform role-based access control (RBAC). The more detailed operations of the data management server 130 and other examples of services and features provided by the data management server 130 are further discussed in this disclosure.

In some embodiments, the data management server 130 may provide adaptive security application scenarios to help organizations reduce access management and governance complexity. The data management server 130 may help an organization 110 to reduce the risk level, eliminate the friction in identity management and governance, and enable adaptive security. In some embodiments, the data management server 130 may provide continuous access evaluation. For example, the data management server 130 may provide a dashboard to an organization 110 to provide access and security assessment. The dashboard may take the form of an access utilization dashboard, which can provide a solution that helps organizations 110 to identify and manage inactive user accounts and permissions, thus reducing the risk of security attacks and improving overall security. The dashboard may provide real-time insights and the ability to easily remove or adjust access by an administrator device 114. The dashboard streamlines the process of continuous access evaluation, making it simple for administrators to adhere to compliance and enhance the security posture of an organization 110.

In some embodiments, the data management server 130 may offer comprehensive utilization review functionalities, encompassing the identification of inactive and dormant accounts, analysis of active accounts and unused permissions, and evaluation of the overall security posture by tracking the percentage of active accounts and the trends over time. The data management server 130 may identify accounts with no user activity or logins within a specified timeframe. Additionally, or alternatively, the data management server 130 may scrutinize active accounts, defined by recent activity within a predetermined period, and examine permissions that remain unused by users over a specified time frame. The access utilization reports may also include trends, such as a sudden increase in data access of a specific account or permission. The data management server 130 may recommend remediation actions to an organization 110 to address dormant accounts and unused permissions, thereby fortifying security measures.

In some embodiments, the data management server 130 may provide risk monitoring to identify and mitigate potential security and access risks, enhancing overall security posture and compliance through real-time insights and automated decision-making processes. The data management server 130 may provide real-time insights and automated decision-making processes, thereby simplifying the complexity of security and access management. The risk level analysis may take the form of a risk level review that identifies high-risk activities exercised recently. The risk level analysis may also take the form of an overall risk score that may change over a period of time. In remedying the identification of a high-risk activity, the data management server 130 may provide an alert and a suggested action for the organization 110 to address the high-risk activity. In some embodiments, for a high overall risk score, the data management server 130 may provide suggestions and identify specific activities or data resources that are related to the high-risk score.

In some embodiments, the data management server 130 may provide access hygiene review capabilities that assess risk levels and monitor risk score trends, prescribing remediation actions for high-risk activities and proactive measures to uplift the risk score. In some embodiments, the data management server 130 may provide access analytics to provide an organization 110 real-time analyses into access governance, risk reduction, and security posture enhancement, allowing for detailed analysis of access activities, resource access, and permission posture through graphical representations.

In some embodiments, the data management server 130 may provide access analytics that may take various forms to provide real-time analyses for an organization 110 to improve access governance, reduce risks, and enhance security posture. An example of access analytics may be providing detailed access graphs that illustrate access paths and permissions within an organization 110, allowing administrators to access details of various workspace data sources 120 used by the organization 110. The output of the data management server 130 may include analysis of the access graph and event data that identify the risk vulnerabilities and the corresponding severity rankings. In some embodiments, an access graph may include activity analysis based on the access graph query result. Access activities may show the name of the actor, time stamp, risk severity, anomaly versus regular activities, and other suitable indicia. The data management server 130 may provide various access activity analysis features to identify accesses that are exercised in an organization 110, such as recent access activities across the organization 110, or certain units in the organization 110. The activity level analysis may be stored and presented in the form of a time series to allow an administrator of the organization 110 to review activities in different timeframes with respect to a specific user, a specific account, and/or a specific data resource. The permission posture may be presented as an access graph to illustrate activities exercised on a permission set.

By way of example, the data management server 130 may provide a composite data access graph that illustrates connections between accounts and data resources and additionally provides a summary of to data access activities of the accounts to the data resources. The data management server 130 may query various sets of metadata received from different workspace data sources 120 and generate graph objects according to a standardized data schema. The graph objects may include nodes that represent accounts, data resources, and data access activities. The data management server 130 may also store edges that record connections between two nodes in order to establish a graph. The data management server 130 may use a graph algorithm to generate a graph that illustrates the connections between accounts and data resources. The graph may be generated with respect to a named entity who may have multiple accounts across different workspace data sources 120. The graph may include nodes representing an account and a data resource that is connected to represent the data permission of the named entity to the data resource and a graphical representation of a data access activity level of the account accessing the data resource. The data access activity level may be aggregated from the activity objects representing the instances of the account accessing the data resource. For example, the graphical representation may take the form of a line that connects an account node in the graph and the data node representing the data resource. The thickness of the line may be commensurate with the data access activity level. In some embodiments, the nodes in an access graph are selectable for display of attributes of the selected nodes and for the performance of data access management tasks such as granting or revoking access.

In some embodiments, the access graphs may be generated in the forms of user access graphs and resource access graphs. In some embodiments, a user access graph may focus on a named entity. For example, a user access graph may illustrate how a specific user gains access to a particular data resource, showing resources accessible to the user along with the access paths, delineating the access permission from identity to role, permission, and finally, the data resource. In some embodiments, a resource access graph may focus on a data resource. For example, the resource access graph may elucidate how access to a particular resource is granted to a specific user, displaying users with access to the resource and their corresponding access paths, illustrating the progression from the resource to permission, role, and identity. These graphical representations offer an understanding of access paths and permissions, facilitating efficient access management and security administration. U.S. patent application Ser. No. 18/592,051, entitled "Event Integrated Access Graph Data Management" is incorporated by reference herein for all purposes.

In various embodiments, the data management server 130 may take different suitable forms. For example, while the data management server 130 is described in a singular form, the data management server 130 may include one or more computers that operate independently, cooperatively, and/or distributively. In some embodiments, the data management server 130 may be a server computer that includes one or more processors and memory that stores code instructions that are executed by one or more processors to perform various processes described herein. In some embodiments, the data management server 130 may be a pool of computing devices that may be located at the same geographical location (e.g., a server room) or be distributed geographically (e.g., cloud computing, distributed computing, or in a virtual server network). In some embodiments, the data management server 130 may be a collection of servers that independently, cooperatively, and/or distributively provide various products and services described in this disclosure. The data management server 130 may also include one or more virtualization instances such as a container, a virtual machine, a virtual private server, a virtual kernel, or another suitable virtualization instance. The data management server 130 may provide organizations 110 with various data management services as a form of cloud-based software, such as software as a service (SaaS), through the network 160. In some situations, the data management server 130 may also refer to the entity that operates the data management server 130.

The system environment 100 may include various data stores 140 that store different types of data for different entities. For example, one or more workspace data sources 120 may each be associated with a data store 140. An organization 110 may also have data stores 140 that store the organization's data. In this situation, the data store 140 may be an example of one type of workspace data source 120. The data management server 130 may also use one or more data stores 140 to store data related to preference, configurations, and other specific data associated with each organization's customer. The data access metadata that is standardized by the data management server 130 may also be stored as data objects in one or more data stores 140.

Each data store 140 includes one or more storage units, such as memory, that take the form of a non-transitory and non-volatile computer storage medium to store various data. The computer-readable storage medium is a medium that does not include a transitory medium, such as a propagating signal or a carrier wave. In one embodiment, the data store 140 communicates with other components by the network 160. This type of data store 140 may be referred to as a cloud storage server. Examples of cloud storage service providers may include AMAZON AWS, DROPBOX, RACKSPACE CLOUD FILES, AZURE, GOOGLE CLOUD STORAGE, etc. In some embodiments, instead of a cloud storage server, a data store 140 may be a storage device that is controlled and connected to the data management server 130. For example, the data store 140 may take the form of memory (e.g., hard drives, flash memory, discs, ROMs, etc.) used by the data management server 130, such as storage devices in a storage server room that is operated by the data management server 130.

A user device 150 may also be referred to as a client device. A user device 150 may be controlled by a user who may be the user of the data management server 130, such as an administrator of the organization 110. In such a case, the user device 150 may be an example of the administrator device 114. In some cases, a user device 150 may be controlled by an employee of an organization 110. The user device 150 may be used to gain access to one or more workspace data sources 120, such as to access a software platform provided by one of the workspace data sources 120. The user device 150 may be any computing device. Examples of user devices 150 include personal computers (PC), desktop computers, laptop computers, tablet computers, smartphones, wearable electronic devices such as smartwatches, or any other suitable electronic devices.

A user device 150 may include a user interface 152 and an application 154. The user interface 152 may be the interface of the application 154 and allow the user to perform various actions associated with application 154. For example, application 154 may be a software application, and the user interface 152 may be the front end. The user interface 152 may take different forms. In one embodiment, the user interface 152 is a software application interface. For example, a business may provide a front-end software application that can be displayed on a user device 150. In one case, the front-end software application is a software application that can be downloaded and installed on a user device 150 via, for example, an application store (App store) of the user device 150. In another case, the front-end software application takes the form of a webpage interface of organization 110 that allows clients to perform actions through web browsers. The front-end software application includes a graphical user interface (GUI) that displays various information and graphical elements. For example, the GUI may be the web interface of a software-as-a-service (SaaS) platform that is rendered by a web browser. In some embodiments, user interface 152 does not include graphical elements but communicates with a server or a node via other suitable ways, such as command windows or application program interfaces (APIs).

In system environment 100, multiple different types of applications 154 may be operated on a user device 150. Those applications 154 may be published by different entities and be in communication with different components in the system environment 100. For example, in some embodiments, a first application 154 may be a software application that is published as one of the workspace data sources 120 for the employees of the organization 110 to perform work-related tasks. In some embodiments, a second application 154 may be a data management application published by the data management server 130 for a user to perform data management and view composite data graphs. These are merely examples of various types of applications 154 that may be operated on a user device 150.

An IAM service provider 155 may refer to a system, server, platform or apparatus for facilitating and managing the authentication, authorization, and governance of user access to resources within a networked environment. An IAM service provider 155 may include one or more computational components configured to establish, enforce, and monitor identity and access policies for users, applications, devices, and services. In some embodiments, an IAM service provider 155 may be used to detect unauthorized access attempts, analyze access behavior to identify patterns, and mitigate security risks. In some embodiments, the IAM service provider 155 operates as a cloud-based service, offering scalable, centralized identity management and access control capabilities. Alternatively, the IAM service provider 155 may be implemented as an on-premise solution or a hybrid deployment, where identity governance is distributed across multiple environments.

In various embodiments, examples of an IAM service provider 155 may include Amazon Web Services (AWS) IAM, Microsoft Azure Active Directory (Azure AD), Okta, Ping Identity, Google Cloud Identity and Access Management, IBM Security Verify, etc. AWS IAM enables secure access control to AWS services and resources through user policies, roles, and permissions. Azure AD, a cloud-based solution, manages user identities, groups, and access to resources and applications within the Microsoft ecosystem. Okta offers a comprehensive identity platform that includes single sign-on (SSO), multi-factor authentication (MFA), and lifecycle management. Similarly, Ping Identity provides identity solutions such as SSO, MFA, and adaptive authentication to secure access for enterprise users. Google Cloud IAM offers granular role-based permissions to manage access to Google Cloud resources, while IBM Security Verify provides adaptive authentication and identity lifecycle management for enterprises. In some implementations, the IAM service provider 155 may include one or more service providers in the system environment 100.

The communications among an organization 110, a workspace data source 120, the data management server 130, a data store 140, a user device 150, and an IAM service provider 155 may be transmitted via a network 160. The network 160 may be a public network such as the Internet. In one embodiment, the network 160 uses standard communications technologies and/or protocols. Thus, the network 160 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express Advanced Switching, etc. Similarly, the networking protocols used on the network 160 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 160 can be represented using technologies and/or formats, including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. The network 160 also includes links and packet-switching networks such as the Internet.

Data Ingestion Pipeline Architecture

Figure 2:
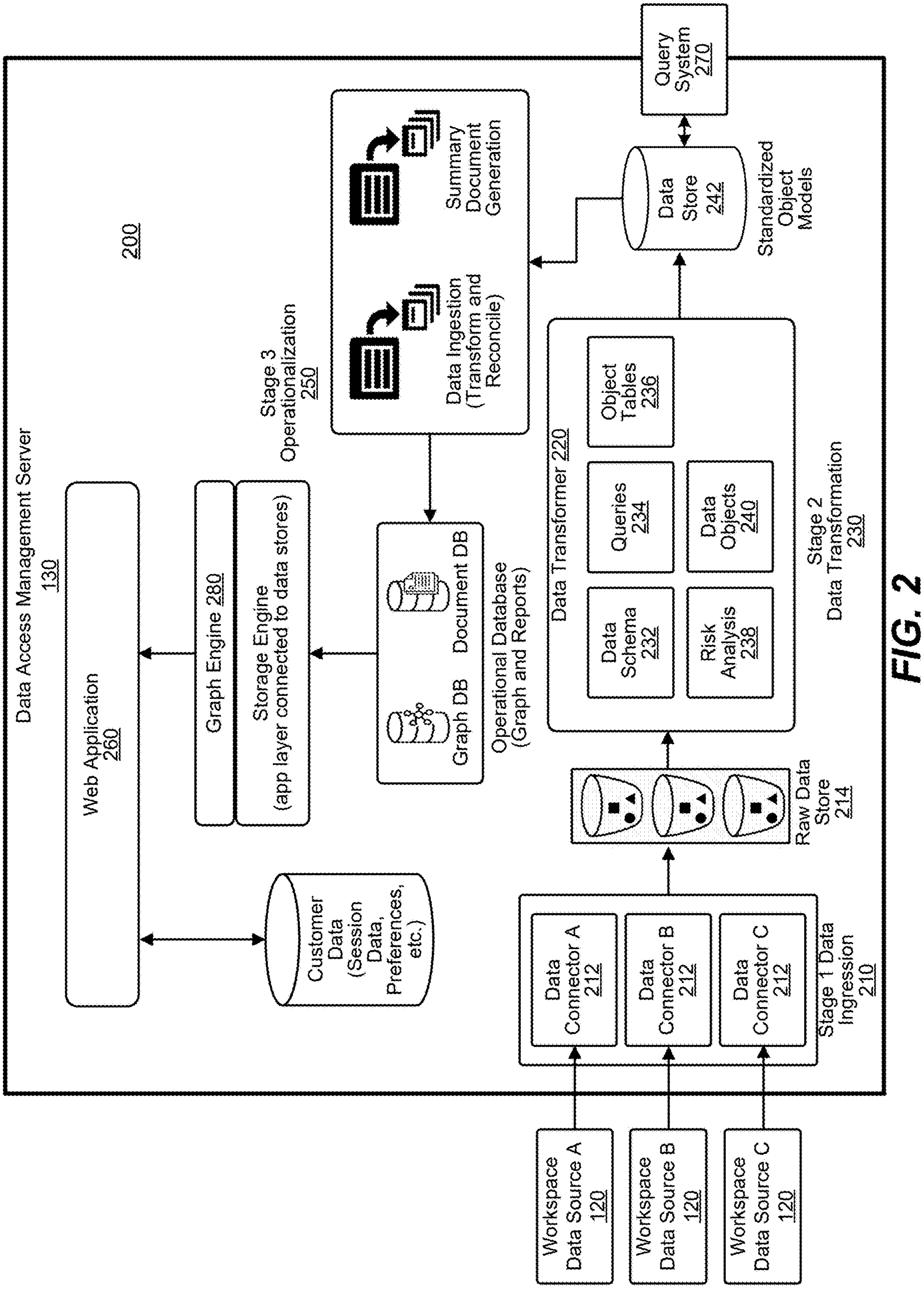
FIG. 2 is a block diagram illustrating an example data pipeline of the data management server, in accordance with some embodiments.

FIG. 2 is a block diagram illustrating an example data pipeline 200 of the data management server 130, in accordance with some embodiments. FIG. 2 illustrates the data pipeline 200 in which the data management server 130 receives data from various workspace data sources 120, normalizing the data, and rendering the standardized data objects to operational databases (graph and document databases). While the discussion of FIG. 2 is described using one organization 110, the data pipeline 200 may be repeated for multiple organization customers of the data management server 130, with some of the organizations 110 using the same types of workspace data sources 120. The data pipeline 200 includes intermediate storages and separation of data store per organization 110, in accordance with some embodiments.

The data pipeline 200 may include three main stages which may be referred to as the first stage of data ingression 210, the second stage of data transformation 230, and the third stage operationalization of data 250. The data ingression stage 210 may involve connecting the data management server 130 to various workspace data sources 120 and enabling the data management server 130 to receive data and metadata of an organization 110 from those connected workspace data sources 120. The data transformation stage 230 may involve the data management server 130 standardizing various data formats, generating data objects according to a standardized data schema, and classifying data objects based on attributes defined by the data management server 130. The data transformation stage 230 may also include data enrichment such as performing computations on transformed data and add data from additional sources (e.g., external sources and open world data) to enrich the normalized data for downstream applications such as risk analysis. The data operationalization stage 250 may involve putting standardized data objects into various downstream applications and storing data in operational databases ready to be rendered for users. In various embodiments, the data pipeline 200 may include additional, fewer, and different stages. The features and functions described in each stage may also be distributed differently from the explicit example discussed in FIG. 2.

The data ingression stage 210 may include onboarding, channel establishment, some quick conversions of file formats, and other data ingression steps. The data management server 130 may receive a grant of permission from the organization customer to receive data of the organization customer from a workspace data source 120, such as SaaS platform. In some embodiments, the onboarding may include an initialization of channel establishment that allows the provisioning of the organization customer's credentials for the organization 110 to authorize the data management server 130 to establish a data connector 212 to pull data from a workspace data source 120. In some embodiments, the data management server 130 may provide an onboarding user interface for the organization 110 to authorize the sharing of organization data with the data management server 130. An instance of a data connector 212 may be created and store a customer-provisioned token for connection with a workspace data source 120.

Common workspace data sources 120 may include different data connection methods and the data management server 130 may include various data connectors 212 tailored to the workspace data sources 120. Common workspace data sources 120 may include SALESFORCE, SERVICENOW, GOOGLE WORKSPACE, MICROSOFT 365, DROPBOX BUSINESS, SLACK, ASANA, ATLASSIAN, SAP, etc. but examples of workspace data sources 120 are not limited to those explicitly discussed. In some embodiments, the data management server 130 may establish an instance of a data connector 212 per domain (workspace) per data source instance (per software application). For example, an organization 110 may have three domains, North America, Asia Pacific, and Europe Middle East Africa, and all three domains have two workspace data sources 120. In such as case, the data management server 130 may establish size instances of data connectors 212 and establish six data pipelines. In some embodiments, the data pipeline separation may be purely logical. Instances of data connectors 212 and downstream data pipelines may share common computing and processing resources. In some embodiments, each domain may be treated as a separate organization 110, and data is shared between two domains.

The data management server 130 may maintain a hierarchy of instances to distinguish various organizations, workspaces, software applications, and data resources that are monitored. For example, a customerID may be a unique identifier that represents the organization's customers. The systemWorkspaceID may be a unique identifier that represents a specific workspace within an organization 110. Some organizations 110 might have a single workspace. The applicationInstanceID may be a unique identifier for a software application instance, such as a SaaS platform that may be an example of workspace data source 120. The applicationName may be the name of the software application.

In some embodiments, the types of data connectors 212 vary based on the data channels supported by the workspace data sources 120. A workspace data source 120 may provide one or more data channels to allow the data and metadata related to data access history maintained by the workspace data sources 120 to be exported to the data connectors 212. For example, a workspace data source 120 may offer Application Programming Interfaces (APIs). APIs may take different forms, such as a RESTful API, GraphQL API, webhooks, etc. Other forms of data channels between a workspace data source 120 and a data connector 212 may include file-based exports in a structured file format (e.g., JSON or CSV). In some embodiments, a data channel may include a database replication or sync to allow a data connector 212 to directly connect to the database of the workspace data source 120. In some embodiments, a data channel between a workspace data source 120 and a data connector 212 may take the form of a data stream that allows a continuous flow of data and updates from a workspace data source 120.

In some embodiments, the data ingression stage 210 may involve the storage of raw data and a simple conversion of raw data to a common file format. The file format may be in comma-separated values (CSV), JavaScript Object Notation (JSON), extensible markup language (XML), or another suitable format, such as key-value pairs, tabular, or spreadsheet format. The data management server 130 may store the data in a raw data store 214, such as AMAZON WEB SERVICES (AWS) S3 buckets, AZURE BLOB STORAGE, IBM OBJECT STORAGE, DIGITALOCEAN SPACES, etc. The raw data from different workspace data sources 120 may be converted to a file format such as the CSV format. The raw data files may contain the raw data with identifiers that correspond to source table names in the workspace data sources 120 and columns in CSV files (or another file type) that match the field from the source schema.

In some embodiments, the data transformation stage 230 may process and transform the data received from various workspace data sources 120. The data transformation stage 230 may be performed by a data transformer 220, which may include sets of instructions for performing various data transformation operations as discussed below. The data transformer 220 may be a data processing unit to perform data processing tasks. In some embodiments, the data transformer 220 may include memory and one or more processors. The memory stores the instructions. The instructions, when executed, cause one or more processors to perform the data processing tasks.

The raw data in the raw data store 214 may be treated as the data source in the data transformation stage 230. Data query, normalization, aggregation, and other transformation operations may be performed. The output of the data transformation stage 230 may be created as data objects 240 according to a standardized data schema defined by the data management server 130. The data objects 240 may be structured and standardized and may be stored in a relational database. The data object may be stored in any suitable structured formats, such as comma-separated values (CSV), JavaScript Object Notation (JSON), extensible markup language (XML), or another suitable format, such as key-value pairs, tabular, or spreadsheet format. The created data objects 240 may be stored based on the types of data objects 240 in one or more object tables 236. In some embodiments, formal relational databases may be used. The data management server 130 maintains per-workspace isolation by creating separate database instances for each organization customer and its domains.

In some embodiments, the data transformation stage 230 may store graph objects according to a data schema 232. The data schema 232 may be defined and standardized by the data management server 130. A graph object includes attributes whose values are generated based on querying the sets of metadata that are stored in the raw data store 214. While the raw data may include different fields and formats based on the workspace data sources 120, the data transformation stage 230 may re-generate the data to create graph objects. The graph objects may include different types such as node objects and edge objects. The node objects may include an account node type. Each account node may represent an account from a workspace data source 120. The node objects may also include a data resource node type. Each data resource node may represent a data source that is stored in a workspace data source 120. The node objects may further include an activity node type. An activity node may represent an instance of data access activity. For example, when an account accessed a data resource at a workspace data source 120, a data access activity was recorded and the data management server 130 in the data transformation stage 230 captures the activity and creates an activity node. The graph objects may also include an edge type. An edge may identify a connection between any two types of nodes in the data schema 232.

The data schema 232 implemented within the data management server 130 may define data object formats and attributes for data objects 240 that are commonly various downstream applications of the 130. In some embodiments, the data schema 232 may adopt a network graph model. The data schema 232 may define an integrated representation of a data access graph, where nodes signify elements and edges illustrate the interactions among nodes. The graph data objects 240 created according to the data schema 232 may enable downstream applications to execute various graph theory algorithms, enabling functionalities such as path identification and cluster discovery essential for comprehensive data analysis. The data schema 232 may represent asset classes and individual assets, which permits the mapping of permissions and events for analytical assessment. For instance, within certain SaaS applications, the data schema 232 delineates between broader asset classes (such as "resources") and granular instances of singular assets (such as "resource instances"). This distinction allows for a nuanced analysis of permissions and events applicable to both the broader asset class and individual instances, thereby enhancing the analytical depth. In some embodiments, the data schema 232 may integrate event or user activities into the access-graph framework, representing these activities as nodes to establish meaningful relationships between actors and data resources. This integration facilitates the analysis of access path usage, aiding in the identification of underutilized or infrequently accessed pathways within the access-graph structure. The data schema 232 within the data management server 130 provides a framework for data standardization, analysis, and optimization across various downstream applications.

Without the loss of generality, however, in this disclosure, a data resource may simply refer to a resource or a resource instance unless the two concepts are specifically distinguished. Likewise, a general use of the resource node may refer to either the resource node or a resource instance node.

While graph objects that are defined according to a data schema 232 are described, the data management server 130 may also create other types of data objects 240. The generation of various data objects 240 may include querying various events from the raw data and selecting the attributes based on a predefined data schema 232. A data object created may include the attributes and an identifier signifying the instance of the data object. The data objects 240 of the same type may be stored in a data table that may be queried and sorted structurally based on the attributes of the type of data objects 240.

The generation of data objects 240 in the data transformation stage 230 may include the data management server 130 querying the raw data based on one or more attributes as defined by the data schema 232. For example, one type of data objects 240 may be account objects that have attributes such as user_name, email, title, accountType, creationDate, lastModifiedDate, etc. The data management server 130 may generate one or more queries to the raw data store 214 for the metadata from various workspace data sources 120 and capture accounts that have one or more of those attributes. In another example, another type of data objects 240 may be activity objects that have attributes such as sourceName, sourceRole, creationDate, lastModifiedDate, activity, etc. The data management server 130 may generate one or more queries to the raw data store 214 for the metadata from various workspace data sources 120 and capture activities that are performed on one or more data objects. In yet another example, the type of data objects 240 may be data resource objects that have attributes such as applicationName, applicationRole, createdDate, lastModifiedDate, userLicenseID, userLicenseStatus, lastActivity, etc. The data management server 130 may generate one or more queries to the raw data store 214 for the metadata from various workspace data sources 120 and capture data resources according to the queries and attributes. In some embodiments, data objects 240 may also include edges that record the connections between two data objects. The data management server 130 may generate one or more queries to identify relationships between various data objects 240. The created data objects may be arranged by types in various one or more object tables 236 and the data objects 240 and corresponding object tables 236 may be stored in the data store 242 as standardized object models. Data objects 240 from different domains or different organizations may be separately stored.

The data transformation stage 230 may also include data enrichment before data objects 240 are stored. Data enrichment may involve augmenting the existing data with additional information sourced from various external or internal data sources. The additional information may include demographic data, geospatial data, historical trends, or customer behavior patterns. By way of example, the raw data may include internet protocol (IP) addresses. The data management server 130 may connect to an external database to determine the geolocation of an IP address and also any corresponding transmission identification information associated with the IP address. The raw data may also include email addresses. The data management server 130 may determine various header information of the email addresses. Other suitable enrichment may include identifying the nature of a data instance and querying any suitable external databases (e.g., public, authority, government, and other available databases) to add one or more attributes to the data that are not originally presented in the raw data. In some embodiments, the data management server 130 may also have heuristics or other algorithms to analyze the data to enrich the raw data to generate one or more attribute values of the output data objects 240 in the data transformation stage 230.

In some embodiments, the data transformation stage 230 may include a risk analysis 238 that may analyze either or both the raw data and the data objects 240. The risk analysis 238 may take the form of a risk level review that identifies high-risk activities, such as usual accesses, exercised recently. The risk level analysis may also take the form of an overall risk score that may change over a period of time. In remedying the identification of a high-risk activity, the data management server 130 may provide an alert and suggest action for the organization 110 to address the high-risk activity. In some embodiments, for a high overall risk score, the data management server 130 may provide suggestions and identify specific activities or data resources that are related to the high-risk score.

The data objects 240 stored in the data store 242 may serve as standardized object models for the data management server 130 to perform various downstream applications, such as the generation of composite graphs, further risk analysis, data access management, and revocation, data management policy identification and enforcement, and other features of the data management server 130 that are described in this disclosure.

The third stage in the data management pipeline of the data management server 130 may be the data operationalization stage 250. The data objects 240 may be further organized and transformed into the application-ready stage. This stage may optimize the data so that the data is ready for downstream application consumption. Depending on the type of downstream application, the data operationalization stage 250 for each downstream application may be different.

By way of example, one downstream application may be the display and generation of data access composite graphs. In some embodiments, there may be various formats of storage that may take the form of operational ready optimized databases, such as graph database, document database, relational database, NoSQL open search database, etc. The data objects 240 in the data store 242 may be converted into graph objects that are comparable to a graph database architecture that will serve for graph visualization, graph network queries and implementations of graph network analysis algorithms. The data objects 240 in the data store 242 may also be analyzed by one or more algorithms to generate summary reports that are optimized to provide high-performance access to report pages (such as access utilization, risk summary, etc.) in the document database. In the data operationalization stage 250, the data management server 130 may also store organizational customer data, such as session data, preferences, configurations, etc., and use the customer data to render the graphs and reports. The final results may be rendered in the web application 260, which may be an example of application 154 in FIG. 1. For data access graph rendering, the data management server 130 may use a graph engine 280, such as one or more graph platform API, to render the graphs based on the node and edge objects stored as part of the data objects 240.

Combining the various stages, the data management server 130 may include the following features in some embodiments. For example, the data management server 130 may provide scalable onboarding with supported applications. Adding new customer instances (a new workspace or a supported application in a workspace) may be configuration-driven. The data management server 130 may perform by updating metadata definition in the ingress stage (connector metadata). Other pipeline stages and processing should be auto-provisioned and triggered automatically.

The data management server 130 may also provide application features agility. The data management server 130 provides wrapping of external heterogeneous schemas to transform into a standardized object model to decouple applications features development from various external workspace data sources 120. Applications can build features on top of the standardized object model agnostic to underlying SaaS application-specific raw data or changes in risk processing algorithms. When the system introduces new user-facing features in user-facing applications—like new filters, reports, network graph visuals, etc., the system adopts the changes with minimal changes in the final stage only.

The data management server 130 may also be observability-ready. Each data connector 212 and data ingression pipeline instance may be implemented as per workspace, per application instance in a workspace. This provides observability to track the status and history of each data pipeline instance. This may also provide logging for single pipeline instances run for diagnostics and alerting capability on pipeline failure. The data operationalization stage 250 may provide the following observability features, such as a dashboard to get the status of each pipeline, last execution details (timestamp, success, failure, data processed statistics), an alert on the failure of any stage on a data pipeline instance, and a way to review the logs of specific data pipeline instances run for diagnostic purposes.

The data management server 130 may also provide a standardized new SaaS applications onboarding, which follows a standard implementation process for integration. Implementation work may establish a new implementation of a data connector 212 in the data ingression stage 210 and new data processing in risk analysis and data transformation implementation in the data transformation stage 230. The data operationalization stage 250 with application-specific logic (reports, graph analysis) in turn works transparently.

Example Data Model Schema

Figure 3:
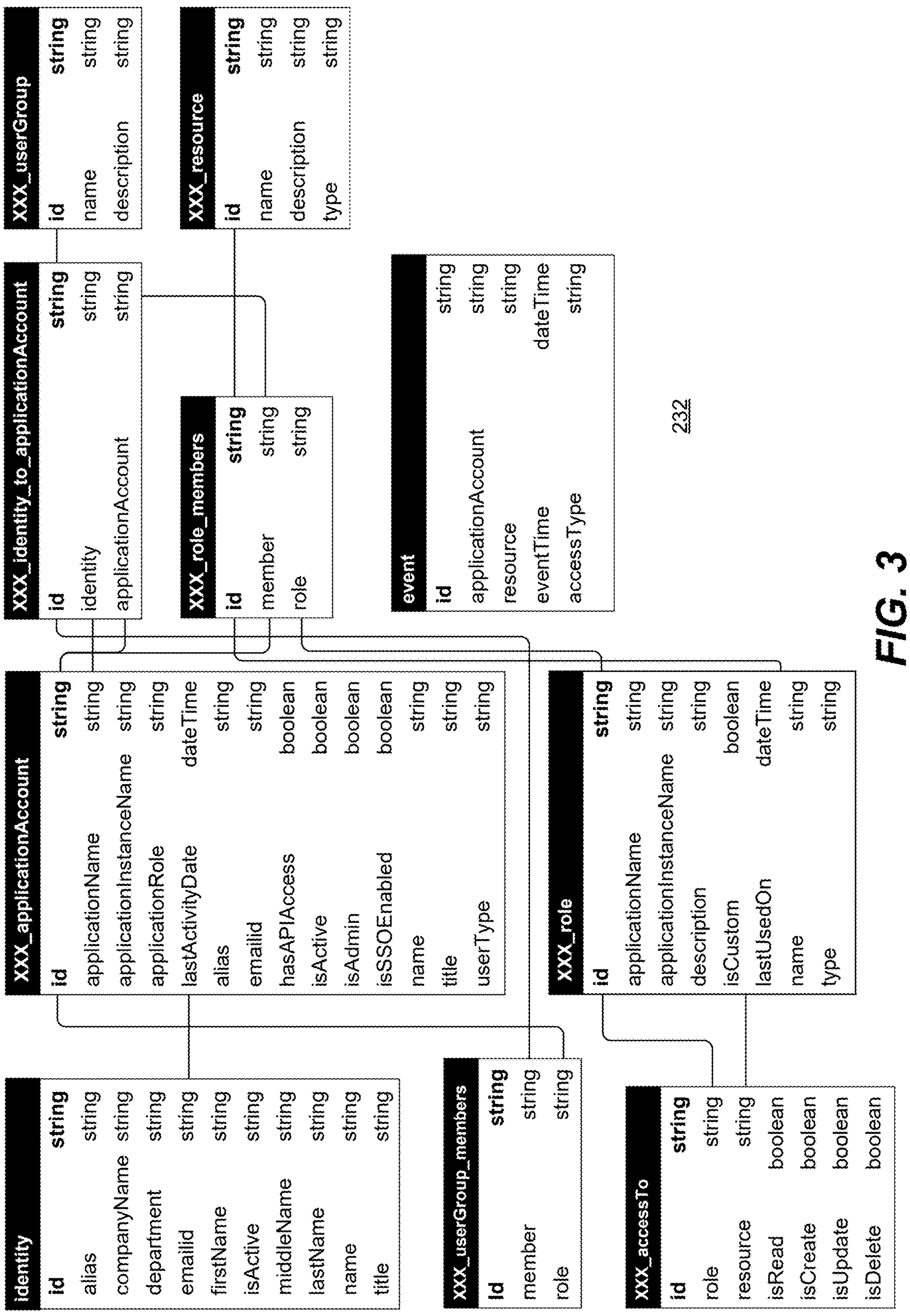
FIG. 3 is an example of a data schema that may be used by the data management server, in accordance with some embodiments.

FIG. 3 is an example of a data schema 232 that may be used by the data management server 130, in accordance with some embodiments. In some embodiments, the data schema 232 may be an abstract layer of various schema formats of various applications. Application logic may be built on the data schema 232, which enables the data management server 130 to support a common set of adaptive access features across various downstream applications in the data operationalization stage 250.

In some embodiments, the common data schema 232 allows the data management server 130 to ingest heterogeneous data models of identity and access management (IAM) schemas, rules, and events from various workspace data sources 120 and transform the data into a common knowledge graph data model that contains objects (nodes) and relationships (edges). In the data transformation stage 230, the data management server 130 may identify the common access graph entities (applicationAccount, userGroup, role, resource, and resourceInstance).

In some embodiments, the object model for the data objects 240 according to the data schema 232 may have multiple entities. Examples of the objects include identity, applicationAccount, userGroup, resource, accessTo, etc. Each object may be a type of node that may be used by the data management server 130 in generating a data access graph. In some embodiments, the various types of objects may have one or more relationships related to other types of objects or the same types of objects (e.g., sub-types). For example, the identity object may be derived from the identity system and represent a named entity. Each identity can have one or more applicationAccounts. ApplicationAccount can have membership to one or more userGroup and/or roles. UserGroup can be nested. UserGroup can have child userGroup. A userGroup can be a member of one or more roles. Roles can be nested. Roles can have child roles. Roles can have permission to one or more data resources. The relationship between an applicationAccount and a resource may be specified by an accessTo data object that specifies the role that has access permission to the resource.

An identity node may represent a unique identity in the data management server 130. An identity node may be a uniquely identifiable identity that represents a named entity within an organization. If a workspace data source 120 is an identity system, the data management server 130 may use the identity from the identity system to represent the account. When other workspace data sources 120 (e.g., other SaaS applications) are onboarded before identity system onboarding, the data management server 130 may use employee emails as identifiers of the accounts.

An applicationAccount node may be used to uniquely identify an account in a software application such as a SaaS platform. A named entity identified by an identity node can have multiple applicationAccounts in different software applications. For example, an employee can have a first application account in SaaS platform A and a second application account in SaaS platform B.

A userGroup node may be a collection of users who can be assigned to a role. A userGroup allows an organization 110 or a software platform to manage permissions for a specific set of users. Users can be added or removed in a userGroup nodes. For example, in a data model of an example workspace data source 120, a "profile" may be equivalent to the user group. Other SaaS applications may have a first-class concept of user groups in their object model. The data management server 130 may translate these types of access management data from the workspace data source 120 to the object model of the data management server 130 in the data transformation stage 230.

A role node may be a collection of permissions that can be assigned directly or indirectly to individual users (applicationAccount) or a user group. For example, in one SaaS platform, "PermissionSet" and "PermissionSetGroup" may be mapped to the role node in the data management server 130. Roles can be nested where a super role can contain other roles, in that case, the child role permissions may also be applied to parent role permissions.

A data resource node may be a unique identifier of a data resource that is being protected by permissions in a workspace data source 120, such as an access control system. A data resource can be a database table, an object, a record, a document, an application, a data instance, etc. A data resource is an instance that may require permission to access. In some embodiments, the data management server 130 may only ingress information (e.g., metadata) that uniquely identifies the data resource but not the actual content or data belonging to the data resource.

In some embodiments, the data management server 130 may also store various edge objects based on the data schema 232. Edge objects may include a hasApplicationAccount edge that establishes the relationship between an identity node and an applicationAccount node. An identity may be the owner of multiple application accounts.

Edge objects may also include a memberOf edge that establishes the relationship between an applicationAccount node and a userGroup node, between a userGroup node and a role node, and a userGroup node and another userGroup node, a role node and another role node, etc. This defines the member relationship among the accounts, groups, and roles in a workspace.

Edge objects may also include an accessTo edge that represents permission to a data resource. The accessTo edge may also include additional boolean attributes to identify the level of permissions enabled by this edge.

Each type of data object (node objects or edge objects) may be associated with one or more attributes. Some attributes may be mandatory for the data object type while other attributes may be optional. The attributes shown in FIG. 3 are examples only and each data object type may have additional, fewer, or different attributes. Some of the attribute fields can be a nested field that refers to another object type. For example, the accessTo object may have a role attribute and a resource attribute to identify which role has access permission to which data resource. Different workspaces may be associated with different prefixes to distinguish the workspace.

In some embodiments, the nodes or edges may include one or more of the following common attributes in the table below. These attributes are merely examples and the data schema 232 may include other attributes as defined by the data management server 130.

| Property | Type | Description |
|---|---|---|
| createdBy | string | Identifier of the creator of the node |
| createdDate | DateTime | Timestamp of the node creation |
| enabled | boolean | Is this node active |
| lastModifiedBy | string | Identifier of the last modifier of the node |
| lastModifiedDate | DateTime | Timestamp of the node's last update |
| displayName | string | Display string of the object representation in UI |
| nodeID | string | Internal elementID of the node in a graph database |
| uniqueID | string | A unique identifier generated during ingestion to uniquely identify a node. |

The data schema 232 may serve to standardize heterogeneous data definitions sourced from different workspace data sources 120, unifying the data into a cohesive representation of access-graph objects, their relationships, events, and associated risks. In some embodiments, the data schema 232 may adopt a network graph model to depict the object structure, where elements are nodes, and the corresponding interactions and connections manifest as edges within a network graph that may be referred to as the access graph.

The data schema 232 of the access graph, presented in a network graph representation, enables applications to execute various graph theory algorithms. These algorithms encompass path identification, cluster discovery, source-to-destination navigation, etc. This allows the data management server 130 to comprehend the behavior of identity and access configurations, evaluate risk, and assess the impact of changes within the graph structure over time. For example, the access graph data objects may be versioned and timestamped such that the access graph may be generated as a time series of access graphs. Users reviewing the graph may go back in time to determine the change in access permission, data management, and access activities over time. In some embodiments, the data management server 130 may provide a graph user interface that provides a time scale for users to select the timing in a time series.

An example definition of the object model according to a data schema 232 may focus on the representation of data asset classes (resources) and the identification of distinct, granular instances of singular data assets (termed resource instances). This unique representation enables the mapping of permissions and events to both the broader class of data assets (resources) and the specific individual instances (resource instances) for analytical purposes. For instance, in certain workspace data sources 120, users can share tables and individual records within those tables. In the corresponding model according to the data schema 232, the table may be represented as a resource, encompassing all records within the table, while the records themselves are defined as resource instances. Consequently, an edge in the network graph representing permission (accessTo) can link to the resource when the permission pertains to all records, whereas a permission edge connecting to a resource instance node signifies permissions applicable to an individual record within the table. This versatile model facilitates the representation of diverse asset types and their instances within a unified object model.

Figure 4:
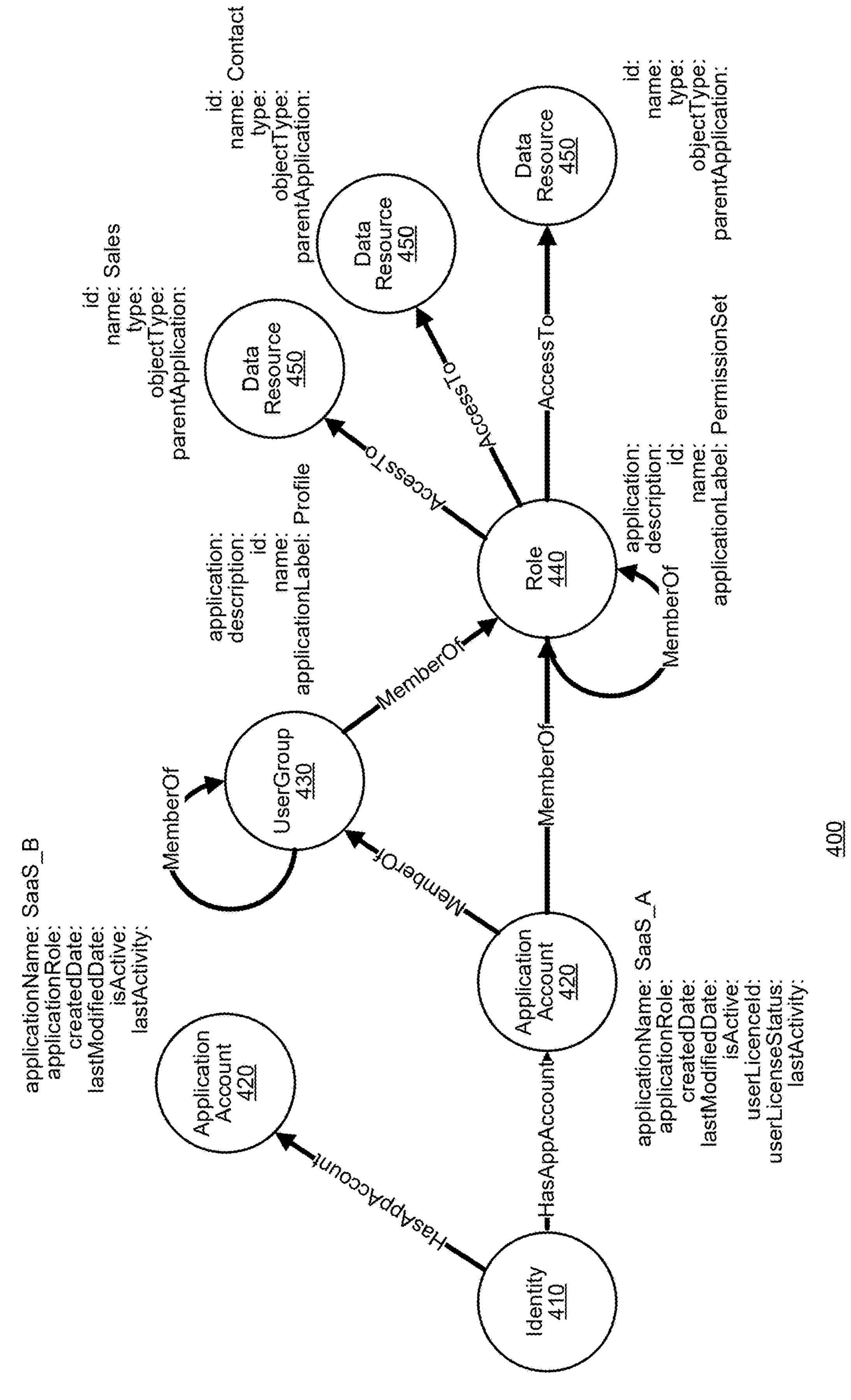
FIG. 4 is a conceptual diagram illustrating an access graph that connects nodes by edges that may take the form of vectors, in accordance with some embodiments.

FIG. 4 is a conceptual diagram illustrating an access graph 400 that connects nodes by edges that may take the form of vectors, in accordance with some embodiments. The data model may be a directed graph. Multiple nodes may be connected to form a composite vector. The data store 242 that stores the data objects 240 may take the form of a unified repository of identity, access policies, and events in a graph database. The data store 242 may store data objects 240 as node objects and edge objects.

The node and edge objects, when connected, may represent an access graph 400 that illustrates the data permission of a named entity to various data resources. For example, the access graph 400 may include an identity node 410, one or more application account nodes 420, one or more user group nodes 430, one or more role nodes 440, and one or more data resource nodes 450. Each type of nodes may include its own set of attributes. For illustration, not all values of the attributes are shown in FIG. 4. The data management server 130 may identify any data permission traversal path that traverses between an identity node 410 (or an application account node 420) and a data resource node 450 to identify data permission between a named entity and a data resource. By way of example, the identity node 410 may have different application accounts for SaaS platform A and SaaS platform B (each may be an example of a workspace data source 120). The application accounts may be represented by the application account nodes 420. For the application account node 420 of the SaaS platform A, the application account may belong to one or more user groups and one or more roles, which may be represented by the user group nodes 430 and the role nodes 440. A role may have access permission to one or more data resources that are represented by the one or more data resource nodes 450.

The data management server 130 may generate node objects and edge objects through queries. The data management server 130 may use structured queries (e.g., structured query language (SQL) queries) to classify data ingested from workspace data sources 120 (e.g., customer's SaaS platform's data) into one or more nodes and/or one or more edges based on queries on the attributes (e.g., as reflected in the metadata). For node objects, the data management server 130 may query the raw data store 214 to identify node objects that fit the attributes defined in the data schema 232. The data management server 130 may build queries specific to each workspace data source 120 because each workspace data source 120 has a different metadata format and fields for storing the metadata. For the edge objects, the data management server 130 may query the raw data store 214 and/or attributes in the node objects to identify connections between nodes. Edges may include identity-to-application-account edge, role-member edge, access-to edge, and user-group-member edge, etc., as illustrated in FIG. 3. Each edge may include a unique identifier for the edge, a first node attribute and a second node attribute together serving as an identification of the connection, and one or more other attributes that signify the natures of the edges. For example, access-to edges may have attributes on the type of access. Alternatively, instead of being an edge, the access-to object may also be a node.

Example Event Nodes

In some embodiments, the data objects 240 according to the data schema 232 may include incorporating data events (e.g., user activities such as accessing or modifying the data) as data objects. Those event data objects and the corresponding associations may be incorporated into the access-graph framework. A standard access event may include an actor (e.g., a named entity represented by an identity or an application account) and a subject (a resource or resource Instance) on which the activity occurs. The data management server 130 may represent these activities as nodes within the access graph, establishing relationships between the actor and subject. As the access graph encompasses various connecting pathways between actors and subjects, the 130 may analyze the frequency of access path usage and identify underutilized or infrequently used paths within the access graph structure.

In some embodiments, event data ingestion may use the same data ingestion pipeline illustrated in FIG. 2. The data management server 130 may import events as nodes. In some embodiments, the event nodes may be with minimum required attributes and full details of scalar data for events may remain outside of the node objects for memory optimization. The data transformation stage 230 may generate two or more types of event tables. In some embodiments, the first type of event table may be a table for resource access events. The table may contain a list of events with reference to the actor (e.g., an ApplicationAccount node) and acted on node (a resource node) with timestamp and operation performed in the event. The second type of event table may be a table for activity risk detail, which may be a table that contains other attributes related to events. The second type of table allows tabular queries and includes detailed information about the events, such as data that are not stored as part of the event graph objects. An event identifier may be used for both tables to reference an event.

By modeling the events, the data management server 130 may perform various analyses related to data events and sequences of events. For example, the data management server 130 may identify and build timeseries of events related to specific actor nodes and data resource nodes that have past events. The data management server 130 may also build a time series of overall events and identify the impacted nodes in the time period. In some embodiments, a resource access event may include the information of the source node (e.g., actor) and the destination node (the data resource or resource instance). The data management server 130 may in turn generate an access graph to allow the detection of possible paths traversing the event. Events can have relationships, such as the sequence of events belonging to a session or generated from specific endpoints. Mapping Event nodes allows the data management server 130 to establish a knowledge base for event relationships.

Figure 5:
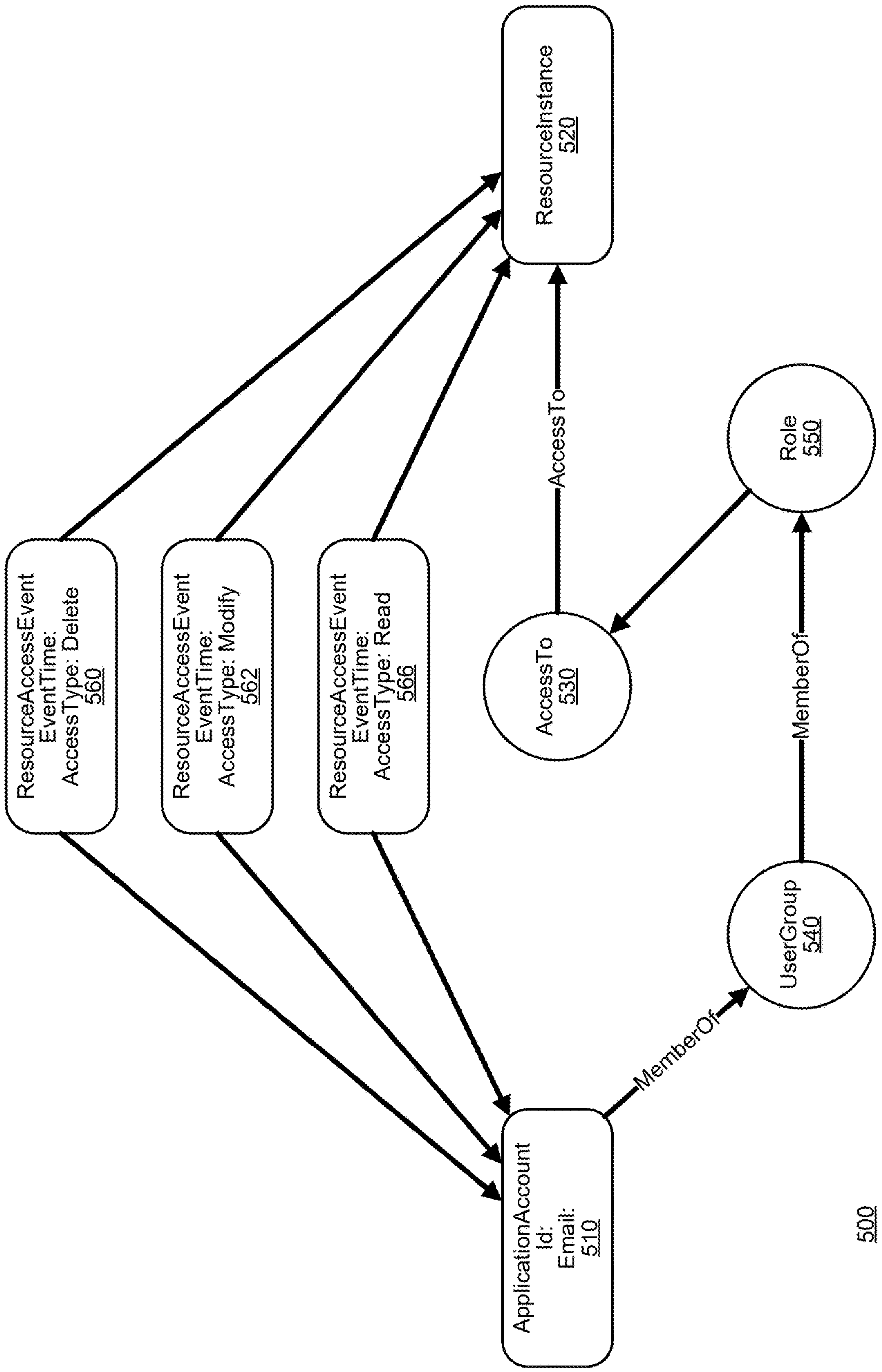
FIG. 5 is a conceptual diagram illustrating relationships of events between a source node and a destination node in an example access graph, in accordance with some embodiments.

FIG. 5 is a conceptual diagram illustrating relationships of events between a source node and a destination node in an example access graph 500, in accordance with some embodiments. The access graph 500 may include a source node, which is an application account node 510. The access graph 500 may also include a destination node, which is a resource instance node 520. In the access graph 500, the application account node 510 and the resource instance node 520 may be connected through one or more access permission traversal paths and event paths. The connection edges in each path may be referred to as vectors.

In some embodiments, an example access permission traversal path may connect the application account node 510 indirectly to a resource instance node 520 by traversing a plurality of intermediate object nodes. For example, the application account 510 may be a member of a user group node 540 and the user group node 540 is a member of the role node 550. The role represented by the role node 550 may have access permission to the data resource represented by resource instance node 520. The access permission may be represented by the access to node 530. As such, the application account node 510 and the resource instance node 520 are indirectly connected through one or more object nodes 530, 540, and 550. In some embodiments, an application account node 510 may have one or more reasons why access permission is granted for the application account to access a data resource. As such, more than one access permission traversal path may be recorded in the access graph. While the access permission traversal path illustrated in this example involves multiple intermediate nodes, in some cases an access permission traversal path may include only the source node and the destination node.

The data management server 130 may store a plurality of event nodes 560*a*, 560*b*, and 560*c* (collective event nodes 560 or individually event node 560) that have direct connections between the application account node 510 and resource instance node 520. Each path traversing the application account node 510, one of the event nodes, and the resource instance node 520 may be an event path. Each event node 560 may include attributes that specify the event type, such as the accessType attribute that signifies the event is a deletion of the data resource represented by the resource instance node 520, a modification of the data resource, and a read of the data resource. Each event node 560 may also be timestamped. In some embodiments, there can be anywhere between zero to many event paths between the application account node 510 and the resource instance node 520. For example, if the application account does not have any access event to the resource instance, there can be zero event path even though the application account node 510 and the resource instance node 520 are connected by an access permission traversal path. In some embodiments, the applicant account may frequently access the data resource. In turn, a large number of event nodes 560 may be stored. The data management server 130 may aggregate the number and the nature of event nodes 560 to display the access nature of an application account to a data resource. For example, if no event node is detected, the data management server 130, in a front-end graphical user interface, may show a dashed line between the application account node 510 and resource instance node 520. Any line, solid or dashed, may signify the presence of a data permission traversal path. The dashed line may signify there is no event node 560 detected. In some embodiments, a solid line may be presented to signify there are event nodes 560 detected. The thickness of the solid line may be commensurate with the number of event nodes 560 aggregated by the application account node 510.

Using the event nodes 560, the data management server 130 may provide an event mapping approach where events are represented as nodes in the graph with edges pointing to the source and destination nodes of the event. Event node 560 maintains information and attributes graph analysis, such as event timestamp, type of operation performed, actor who initiated the event, and data resource instance impacted by the event. Event attribute may include a pointer attribute to applicationAccount and a pointer to ResourceInstance, eventTimestamp, and type of operation (create, read, update, delete) of the event. In some embodiments, more attributes may be added. In some embodiments, only required event data attributes for rendering a graph are stored as part of the event nodes and other scalar event attributes may be maintained outside the graph objects.

Rendering of Data Access Graph

In some embodiments, access metadata sourced from workspace data sources 120 may undergo mapping through standardized relational queries to form a representation within the object schema 232, structured as nodes and edges. Key identity and access elements such as named entities, application accounts, groups, roles, events, and risks may be depicted as nodes within the access graph. Relationships, such as group and role memberships ("member of") and permissions ("access to") are manifested as vectors (directed edges) within the access graph. This transformation process serves to streamline heterogeneous data into a simplified schema of nodes and edges.

For instance, transformed tables such as applicationAccount, userGroups, roles, and resources may include node definitions within the system. Edge definitions in tables such as applicationAccount_memberOf_userGroup and userGroup_accessTo_resource contain references to source and destination nodes, delineating relationships within the dataset.

In some embodiments, the data management server 130 may render a front-end version of an access graph that connects the nodes and edges for the display to end users of the data management platform provided by the data management server 130. An access graph is a network graph representation that illustrates how access to one or more specific resources is enabled for an account.

Figure 6A:
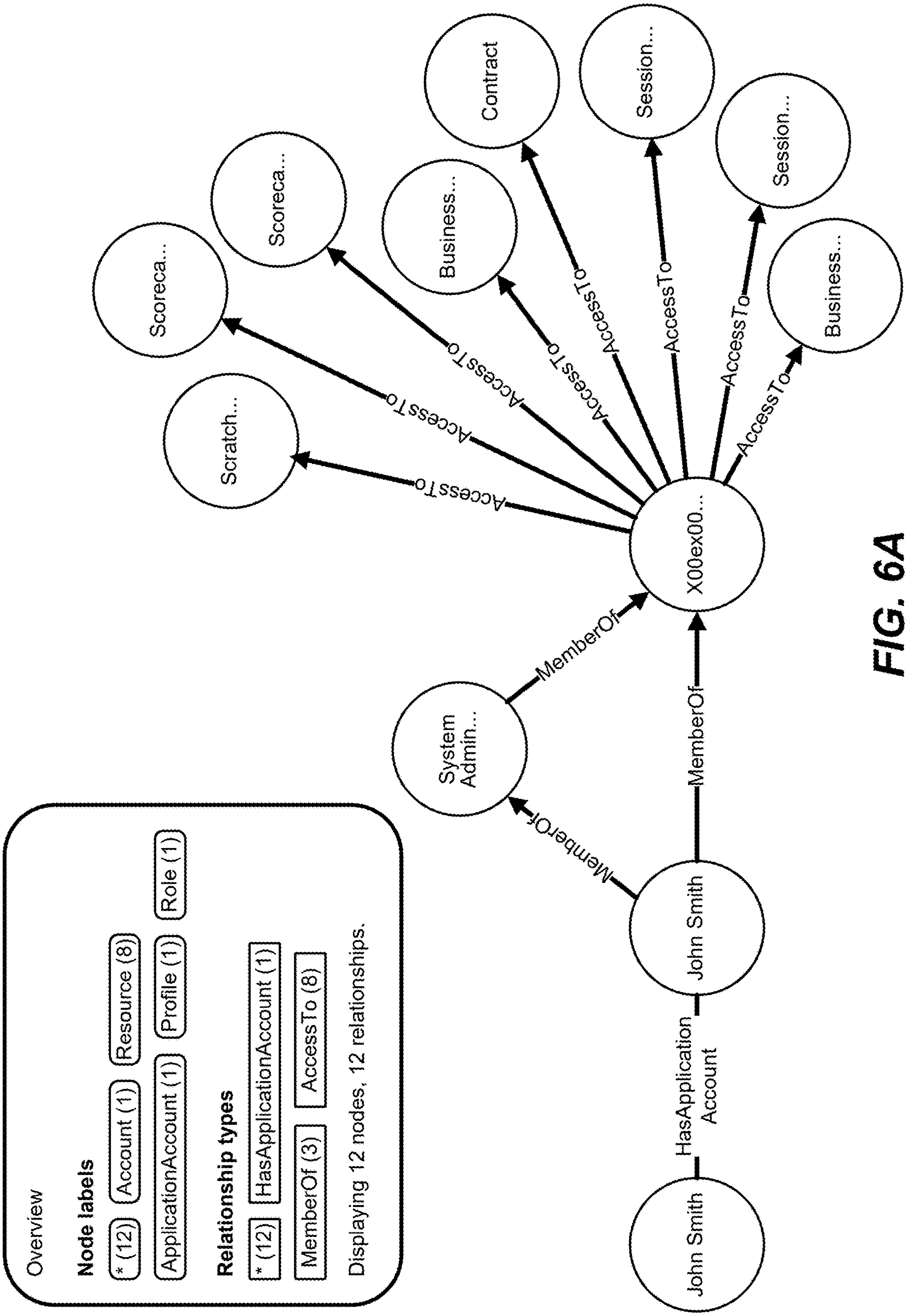
FIG. 6A is a conceptual diagram illustrating a rendered access graph, in accordance with some embodiments.

FIG. 6A is a conceptual diagram illustrating a rendered access graph, in accordance with some embodiments. An access graph has node types (account, applicationAccount, userGroup, role, resource) and edges (hasApplicationAccount, memberOf, accessTo). Further, permissions and roles also may be assigned. Access permission may be represented as AccessTo edges directed to resource nodes.

In various embodiments, various workspace data sources 120 may have different data fields. For example, one platform has concepts of user, userGroup, and role so data fields are mapped as is in the data objects 240 of the data management server 130. The permission information maintained by a workspace data source 120 can be captured from sys_security_acl_role and sys_security_acl table and represented as accessTo edges directed to resources.

Figure 6B:
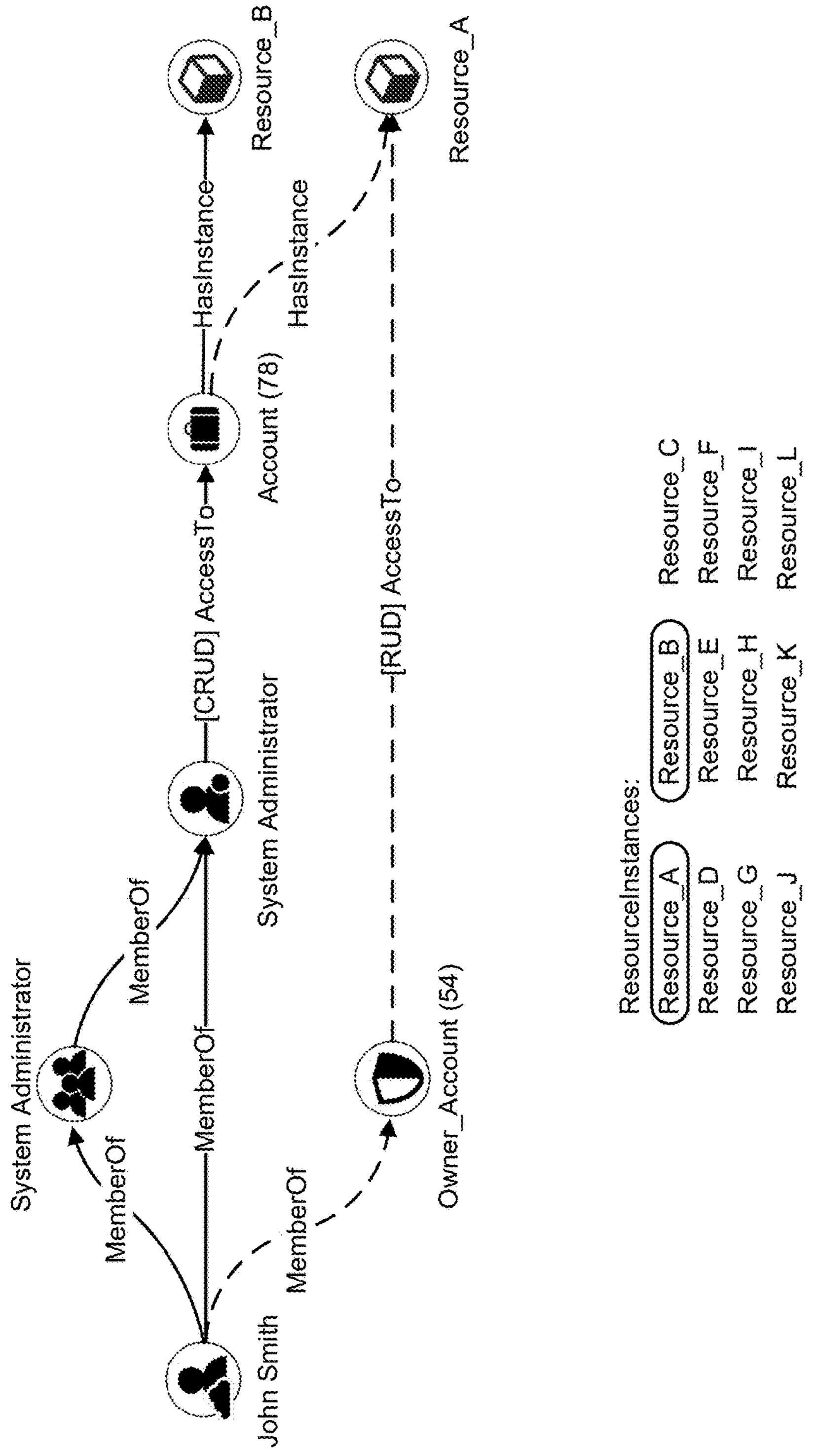
FIG. 6B is an example of a graphical user interface showing a rendered access graph, in accordance with some embodiments.
Figure 6C:
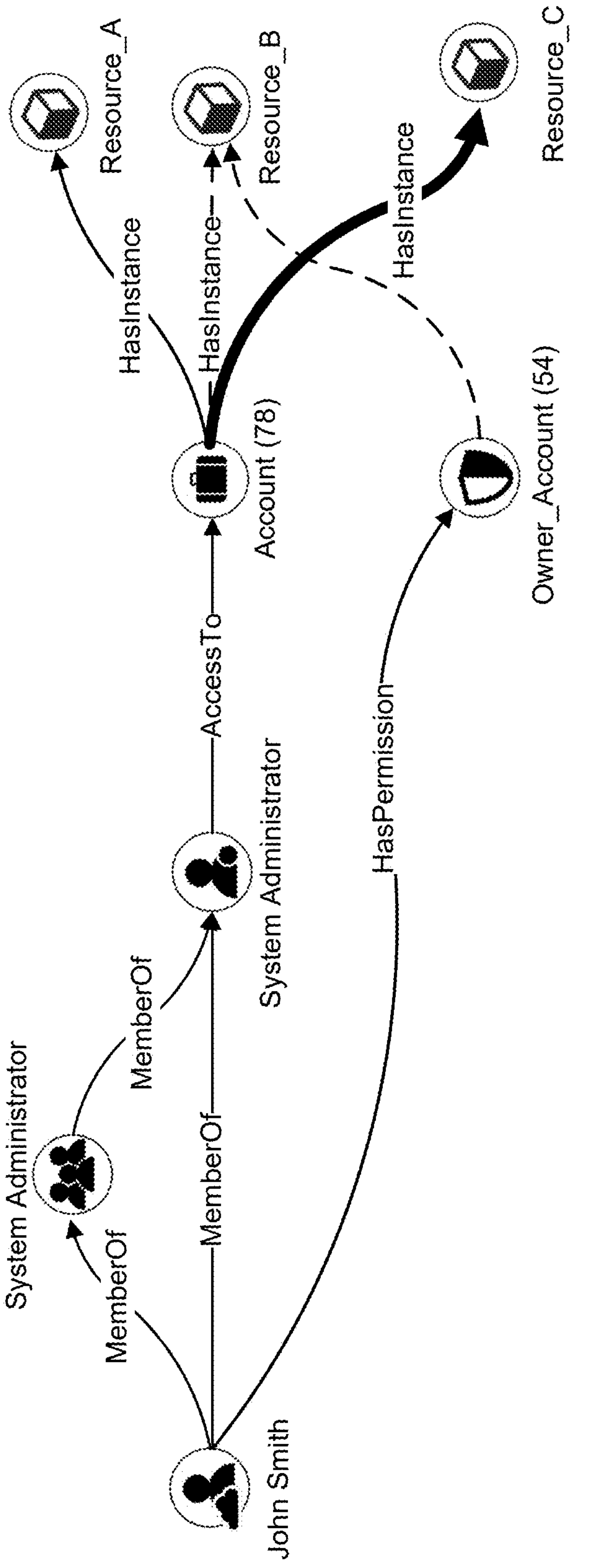
FIG. 6C is an example of a graphical user interface showing a rendered access graph, in accordance with some embodiments.
Figure 6D:
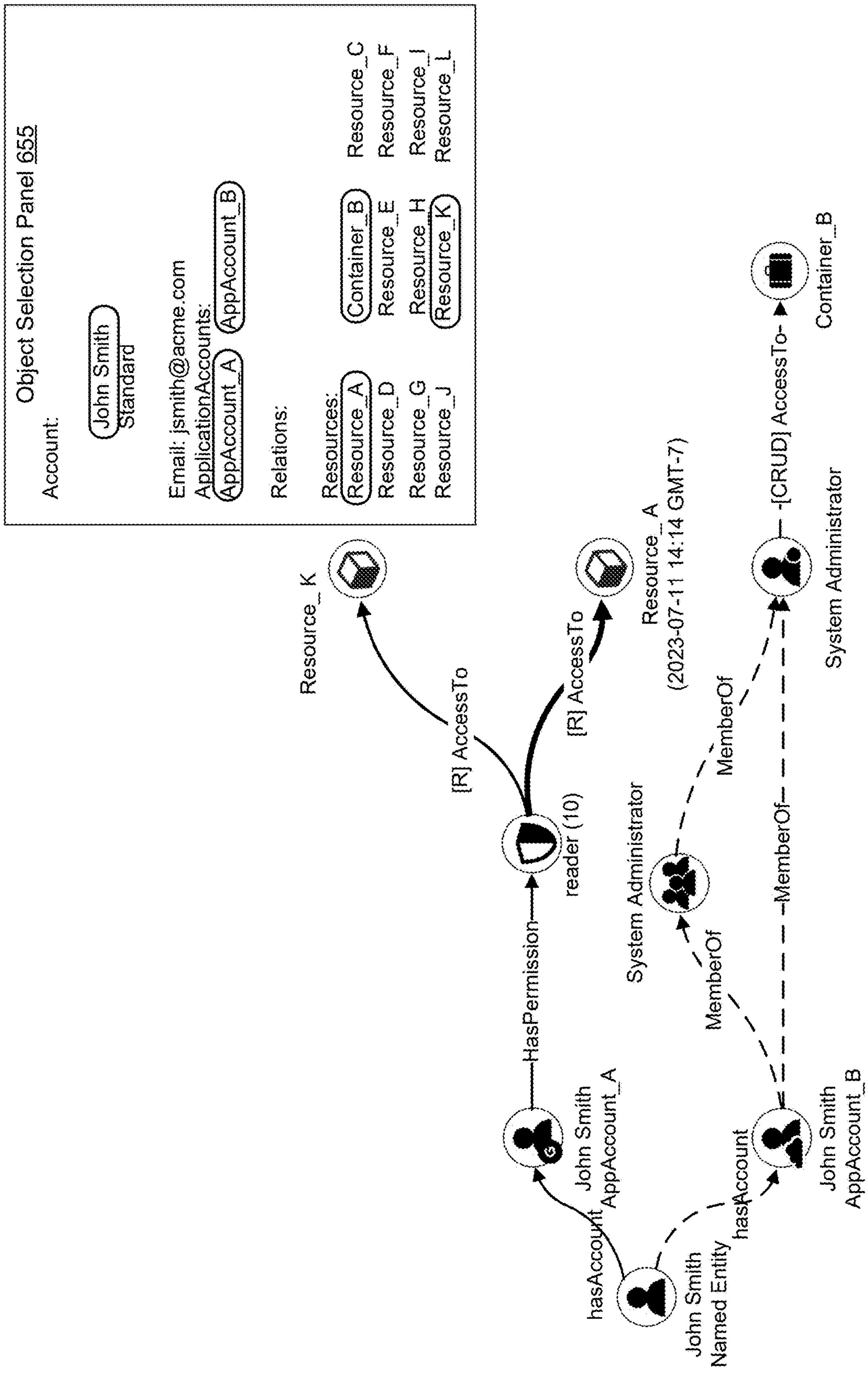
FIG. 6D is an example of a graphical user interface showing a rendered access graph, in accordance with some embodiments.

In various embodiments, the access graphs may include various features. FIG. 6B through FIG. 6D illustrate various examples of graphical user interfaces showing event graphs, in accordance with some embodiments.

The data management server 130 may provide a permission utilization analysis. Graph edges that were potentially used may be specifically marked based on data event logs. Displaying the utilization of access-graph paths as the thickness of edges in the graph provides an illustration in the form of weighted graphs where the weight of every edge represents the number of times that edge was exercised in the access event. FIG. 6C is an example of an access graph with varying thicknesses that are commensurate with the level of activities of an individual performing actions with data.

The data management server 130 may determine dormant members of a group or a role from activity events in the access graph. With events mapped in the access-graph data model, the data management server 130 may determine which users are never exercising permissions enabled by their specific role or group membership. The data management server 130 may use events mapped to access the graph and determine which "memberof" edges (or another type of edge) are never exercised in the access graph. FIG. 6B is an example of an access graph that shows that John Smith is a member of a certain owner account (54) and the dashed line indicates that the records show that John Smith does not access the owner account the resource_A.

The data management server 130 may display the access graph for selected events on the activity analysis page. With events mapped in an access-graph data model, the data management server 130 may build features where the access graph can be displayed while users are reviewing the activities. When an end user selects one or more events in a table (not shown in figures), the data management server 130 may retrieve the access path for those events and show the events in the same spot where the activity frequency chart is shown in another tab in a panel. For example, FIG. 6B and FIG. 6D show that various access graphs may be displayed based on the selection or filtering of criteria such as relations, resources, accounts, etc. The user of the access graph may select one or more criteria in the selection panel, and corresponding access graphs are generated.

For example, FIG. 6D illustrates an example graphical user interface 650 provided by the data management server 130, in accordance with some embodiments. The graphical user interface 650 may include an object selection panel 655 for users to select one or more nodes and/or edges. Based on the user selection, the data management server 130 retrieves relevant nodes, including both end nodes and intermediate nodes, and renders the access graph based on the selection. At the moment presented in FIG. 6D, the user has selected the identity John Smith that represents the named entity John Smith, and also selected Resource_A, Container_B, and Resource_K. In return, relevant access paths and intermediate nodes are rendered in the access paths, such as the two application accounts that are associated with the named entity John Smith. If the user de-selects one of the application accounts, the corresponding access path will disappear from the access graph. Similarly, if the user selects additional nodes such as an additional resource node, the access paths related to the selected additional node will be added to the access graph in the graphical user interface 650.

The data management server 130 may also determine the utilization ratio of different groups and role membership per user basis. With events mapped in an access-graph data model, the data management server 130 can determine the split of the utilization of permissions per user basis. For example, in accessTo permission, if three users accessed a data resource, the data management server 130 can find "accessTo" edge utilization split usage to determine who accessed more frequently and who are rare users.

The data management server 130 may also display a time series of events per Account, Group, Role, Resource, or edges "memberOf" or "accessTo." With events mapped in the access-graph data model, the data management server 130 may determine an access path for each event with a timestamp. This can be used to build the timeseries for individual nodes or edges to determine the time series of all activities performed through that node or edge.

Example Access Control Generation

Figure 7:
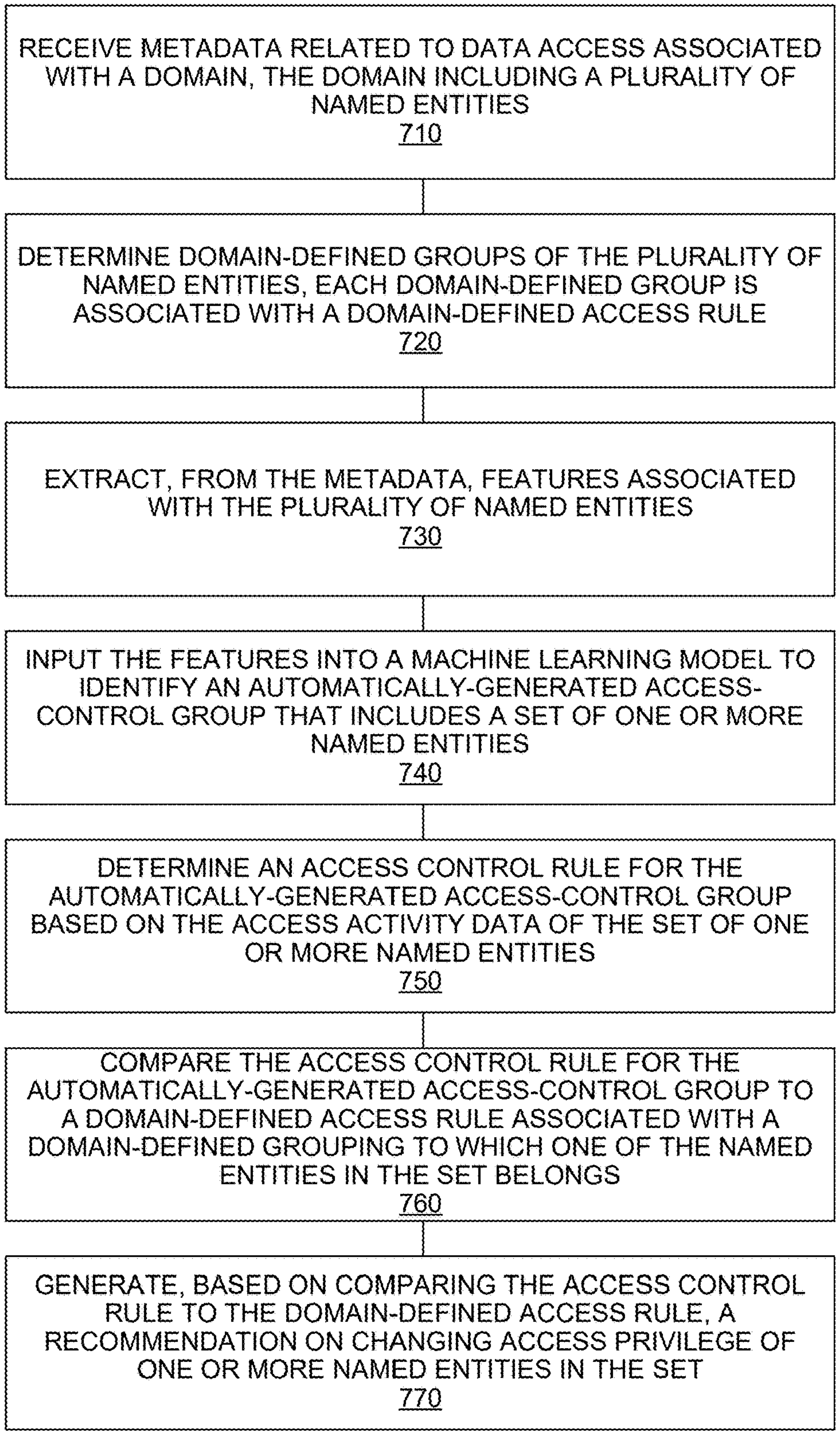
FIG. 7 is a flowchart depicting an example access control rule generation process for performing a continuous access control determination process, in accordance with some embodiments.
Figure 8:
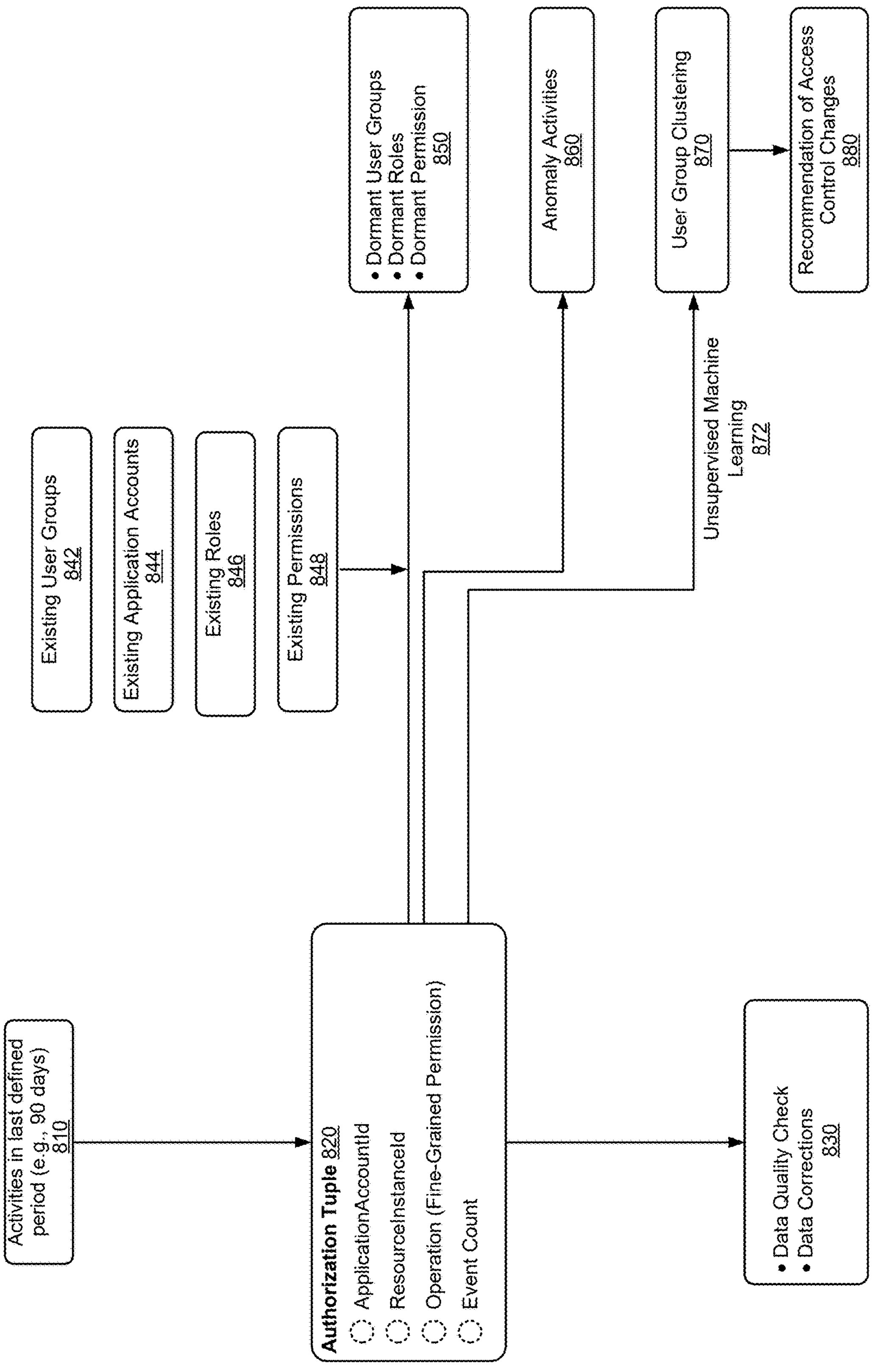
FIG. 8 is a block diagram schematically illustrates various steps and data used in an access control rule generation process, in accordance with some embodiments.

FIG. 7 is a flowchart depicting an example access control rule generation process 700 for performing a continuous access control determination process, in accordance with some embodiments. While process 700 is primarily described as being performed by the data management server 130, in various embodiments the process 700 may also be performed bys any suitable computing devices. In some embodiments, one or more steps in the process 700 may be added, deleted, or modified. In some embodiments, the steps in the process 700 may be carried out in a different order that is illustrated in FIG. 7. FIG. 8 is a block diagram schematically illustrates various steps and data used in an access control rule generation process, in accordance with some embodiments. FIG. 7 and FIG. 8 are discussed in conjunction.

In some embodiments, the data management server 130 may receive 710 metadata related to data access associated with a domain. In some embodiments, the domain includes a plurality of named entities, such as employees of an organization. In this discussion, the term named entities and individuals may be used interchangeably, although named entities may also encompass a group of individuals. An organization 110 or part of an organization 110 is an example of a domain. In this discussion, the term organization and the term domain may be used interchangeably, but a domain may be only part of an organization or may include multiple related organizations.

As illustrated in FIG. 8, the metadata received may be time limited 810 and may be related to activities in a last defined period (e.g., the last 90 days) of a domain. The defined period may be determined dynamically by the data management server 130 or may be manually selected by the domain. For example, the domain may have a quarterly access control policy and this may be used as a time limit. The defined period may be adjusted longer or shorter.

The metadata may include various forms of data, such as any data received from workspace data source 120 and processed using the data pipeline 200 illustrated in FIG. 2. For example, any data illustrated in FIG. 3 may also be considered as the metadata received by the data management server 130. The metadata received by the data management server 130 may also include account access and identity data provided by an IAM service provider 155. Additionally, or alternatively, the metadata may include access control data such as permissions per application, historical security incidents representing unusual access activities, and permission request history indicating records of user requests for additional permissions and the results of the requests.

In some embodiments, the metadata related to data access includes detailed information about named entities, such as their assigned permissions, access activity data, and event counts. For example, access activity data may include logs of specific actions performed by named entities, detailing who performed the action, what data resources were accessed, and when the access occurred. These logs may be stored in a time series database to maintain a historical record of access events.

In some embodiments, the metadata may be parsed to identify individual access events associated with the plurality of named entities. Parsing may involve breaking down complex metadata into structured elements that can be analyzed. For instance, access events may be segmented into subsets corresponding to a defined time period, such as daily or weekly intervals, allowing for a granular analysis of access patterns.

The metadata may also include a time series of access data. In such cases, the data management server 130 may segment the access events into subsets corresponding to predefined time windows, such as 30, 60, or 70 days. The time windows may be defined by the data management server 130 or an administrator of the domain. The data management server 130 may analyze data for derivation of access activity features, including the frequency of access, the distribution of access across resources, and the recency of access events for each named entity.

In some embodiments, the metadata may include authorization attributes to enrich the analysis of access patterns and permissions. As illustrated in FIG. 8, authorization attributes may take the form of authorization tuple 820. Authorization attributes may include user in the form of application account identifier, resource instance, operation with fine grained permissions, and event count. The user attribute may correspond to an application account or user group. The resource attribute may represent a resource instance, which refers to the data or objects that a domain seeks to protect. The operation attribute specifies the action performed on the resource instance, such as "read," "write," or "delete," as governed by a permission role. Together, these authorization attributes provide a structured framework for analyzing access activities. By applying the authorization attributes within the a data schema, such as data schema 232 illustrated in FIG. 3, the data management server 130 can model and analyze user access patterns, permissions, and resource interactions.

More specifically, in some embodiments, application accounts represent the specific identities (human or machine-based) used to access data resources. Application-Account nodes described in FIG. 2 and FIG. 3 are examples of application account metadata. User groups are as collections of application accounts. Named entities (e.g., users in a domain, employees) may inherit permissions assigned at the group level. UserGroup nodes described in FIG. 2 and FIG. 3 are examples of user group metadata. In some embodiments, another example of user metadata is role, which provides a way to group permissions and to be assigned to users or user groups.

In some embodiments, resource instances are the data objects or resources protected by a domain, such as through any access control mechanisms. The resource instance may specify the resource instance being accessed, such as a data object, file, or application, along with its resource type, data classification, and sensitivity level. Data resource nodes 450 discussed in FIG. 2 through FIG. 4 are examples of resource metadata.

In some embodiments, permissions define specific operations authorized for a resource instance. This information is modeled as permission nodes, such as AccessTo discussed in FIG. 2 through FIG. 4. A permission node may be linked to the relevant resource nodes. In some embodiments, activity logs may serve as proxies for fine-grained permissions when direct permission data is unavailable. The activity logs may indicate patterns of access, such as who accessed a resource, the type of operation performed, and the frequency of such operations. The activity logs may be represented as time series data in a timestream database.

In some embodiments, the data management server 130 may generate an access control graph from the metadata. The access control graph includes graph objects. The graph objects may include resource nodes, application account nodes, and access activity data. This graph-based structure enables a detailed representation of the relationships among users, user groups, data resources, and users' access activities on the data resources. Examples of graphs with graph objects are illustrated in FIG. 2 through FIG. 6D.

Continuing with FIG. 7, in some embodiments, the data management server 130 may determine 720 domain-defined groups of a plurality of named entities. A domain-defined group is a group that is defined by the domain based on any rules that are deemed appropriate by the domain. In some embodiments, domain-defined groups may represent logical collections of named entities, such as employees who share similar roles, departments, or access needs within an organization. For example, a legal team in a domain may be considered a domain-defined group because such group is classified by the domain based on employment nature of legal professionals in the legal team. A domain may also define other groups such as sales, IT, engineering, etc. The granularity of groups may vary based on how a domain defines the groups. In FIG. 8, domain-defined groups are illustrated as existing user groups 842 and existing roles 846.

In some embodiments, to identify domain-defined groups, the data management server 130 may analyze hierarchical rules associated with a domain. The hierarchical rules may be derived from organizational charts, reporting structures, or predefined group definitions maintained within the domain. For example, hierarchical rules may identify managers and their direct reports. The data management server 130 may identify groups based on team-level or departmental access needs. For example, by reviewing the organization chart, the data management server 130 may identify named entities of the legal department in an organization. The legal department would be an example of a domain-defined group. In some embodiments, the domain-defined metadata may include hierarchical rules derived from organizational charts or similar sources. For example, hierarchical rules may define relationships among named entities, such as managerial hierarchies or department affiliations. These rules can be extracted to facilitate further grouping and analysis of access control requirements.

In some embodiments, in identifying domain-defined groups, the data management server 130 may traverse an access control graph generated from the metadata to identify activity levels between named entities and the resources they access. The access control graph comprises graph objects, including resource nodes representing data resources, application account nodes representing accounts, and relationships that describe access activity between these nodes. By examining these relationships, the data management server 130 may identify named entity groupings based on the domain-defined permissions, restrictions, roles, and relationships.

In some embodiments, each domain-defined group is associated with domain-defined access rules, such as permissions, restrictions, and specific rules. In FIG. 8, examples of domain-defined rules are illustrated as existing application accounts 844 and existing permissions 848. For example, a domain-defined access rule may grant read-only access to financial records for employees in the accounting department, which allow the accounting employees to view but not modify sensitive data. Another rule may restrict write access to a shared repository exclusively to team leads within the engineering department, while general team members are limited to read-only permissions. Additionally, specific rules may mandate that employees in the human resources department can access only anonymized versions of performance reviews, protecting individual privacy. These domain-defined rules may also include temporal restrictions, such as allowing temporary contractors to access certain resources only during their project tenure or granting access to audit logs to specific users during a designated review period. Domain-defined rules may be enforced by the domain or by data management server 130 assisting the domain in data security. Domain-defined rules may include tailored permissions and restrictions to align with organizational policies and security requirements.

In some embodiments, determining the domain-defined groups may include the analysis of domain-defined access rules. Those rules specify the permissions or actions permitted for each group within the domain. For instance, domain-defined rules may outline that all members of a particular department are granted read-only access to a shared resource or that managers within a specific hierarchy are granted administrative privileges over departmental resources.

Continuing with FIG. 7, in some embodiments, the data management server 130 may extract 730, from the metadata, features associated with the plurality of named entities. These features may include attributes related to access patterns, behaviors, and relationships between named entities and resources within the domain. In some embodiments, at least one feature is associated with access activity data of the named entities accessing data resources within the domain. This feature may be referred to as access activity feature.

In some embodiments, before features are extracted, the data management server 130 may perform pre-processing 830 of data, such as data quality checks and data correction, using techniques such as exploratory data analysis (EDA). Pre-processing may include filtering raw data to remove irrelevant or redundant information. Time-series data may be segmented into subsets corresponding to defined time periods to facilitate downstream analysis. Aggregation may also involve combining data from multiple sources, such as timestream activity logs and graph databases, to produce a unified dataset.

The data management server 130 may perform EDA to understand the quality, distribution, and relationships within the dataset before modeling or feature extraction. By conducting EDA, the data management server 130 can assess the feasibility of analysis, identify potential constraints, and guide the development of feature engineering and model-building strategies.

Some of the EDA tasks may include data exploration. The data management server 130 examines data objects such as user groups, application accounts, resource instances, and the access graph that connects application accounts to resource instances. For example, the data management server 130 may analyze paths in the graph to identify relationships between users and the resources they access, uncovering dormant user groups or misaligned permissions.

In some embodiments, in an EDA, the data management server 130 may address missing data. The data management server 130 may identify and handle gaps in essential organizational metadata, such as user titles, department affiliations, and job functions. Similarly, incomplete information about fine-grained permissions for specific applications or resource classifications may be flagged for further enrichment or approximation.

Timestream activity data exploration may involve assessing the quality and completeness of activity logs, including evaluating percentages of null values, row counts, and unique counts. The data management server 130 examines whether data is sufficiently robust for meaningful analysis.

In some embodiments, the data management server 130 may implement a method for processing metadata, wherein the metadata includes a time series of access data representing access occurrences associated with a plurality of named entities within a defined time period. The data management server 130 is configured to parse the time series metadata to identify individual access events linked to the named entities. These identified access events are then segmented into subsets corresponding to the defined time period, allowing for a structured analysis of access patterns.

Using these segmented subsets, the data management server 130 derives access activity features for input into a machine learning model. These features may be based on characteristics such as the frequency and distribution of access events within each subset. By analyzing these access activity features, the system can enable data-driven insights into access behaviors, enhancing the accuracy and relevance of the machine learning model for tasks such as security optimization, user group recommendations, or access policy refinement.

In some embodiments, the data management server 130 may be configured to extract features associated with a plurality of named entities from metadata by analyzing access activity data. The data management server 130 performs a frequency analysis to determine how often each named entity accesses specific resources within the domain. Additionally, the data management server 130 may conduct a recency analysis to evaluate the time elapsed since each named entity last accessed the resource.

The data management server 130 combines the results of the frequency and recency analyses to generate weighted access metrics that quantify the significance of access patterns for each named entity. These weighted metrics capture both the regularity and recency of resource access, providing a nuanced understanding of access behaviors. The server further derives features from these weighted access metrics, which are then used as input for training or refining the machine learning model. This feature extraction process enables the system to leverage detailed access activity patterns to enhance predictive modeling, optimize access control mechanisms, and improve overall system security and efficiency.

In some embodiments, the data management server 130 may perform Spark-based exploration, which may focus on larger datasets, such as those associated with large tenants (large customer domains). This exploration may include detailed analysis of timestream activity, application account relationships, and resource instances. For example, the data management server 130 may perform department-level investigations to determine trends in the number of accounts, resources, and access activities within specific organizational units.

In some embodiments, the data management server 130 may perform feature extraction 730 after optional pre-processing. The data management server 130 may extract features from metadata such as time series data, organizational hierarchies, and access activity logs. Features derived from this metadata may encompass both quantitative and qualitative aspects, such as the frequency of access events, the duration of access, and the types of operations performed by the named entities. For example, frequency analysis may determine how often a named entity accesses specific resources, while recency analysis may evaluate the time elapsed since a named entity's last access to a given resource.

In some embodiments, feature extraction 730 may include feature engineering to process and transform data into a format suitable for machine learning model training. This stage involves applying advanced data processing techniques to derive meaningful and optimized features from raw data, particularly in role-based access control (RBAC) systems.

Feature engineering may include converting categorical variables into numerical formats for compatibility with machine learning algorithms. For instance, techniques such as LLM embeddings may be used to represent text-based variables in a dense numerical form. Other methods like OneHotEncoder and StringIndexer can encode categorical data into binary or indexed formats, respectively, providing structured numerical representations of group memberships, resource types, or operation categories.

Additionally, or alternatively, dimensionality reduction techniques may be employed to simplify the dataset while preserving its critical characteristics. For example, principal component analysis (PCA) can reduce feature dimensions by identifying the principal components that capture the most variance in the data. Alternatively, or additionally, t-distributed stochastic neighbor embedding (t-SNE) may be used to visualize and identify patterns in high-dimensional data, such as clustering relationships between user groups and resource access. Scaling techniques may also be applied to normalize the dataset and standardize feature ranges. For instance, MinMaxScaling can scale feature values to a specified range (e.g., 0 to 1), while StandardScaler ensures that features have a mean of zero and unit variance.

In some embodiments, feature extraction 730 may also include role mining. Role mining may include analyzing patterns of permissions and access activity data to identify common roles among named entities. Based on domain-defined groups, the data management server 130 may derive features representing shared access roles. For instance, named entities frequently accessing the same set of resources may be assigned features that reflect these common access patterns.

By way of example, in role mining, the data management server 130 may analyze patterns of access permissions assigned to the named entities. This analysis identifies recurring patterns and correlations in access activity data to uncover common access roles shared among the named entities. The data management server 130 further associates the identified access roles with named entities exhibiting similar access patterns. These associations are based on shared resource interactions and permission assignments, enabling the server to define logical groupings of access roles. The data management server 130 generates features that represent these access roles, encapsulating them as structured inputs for the machine learning model. By leveraging these role-based features, the data management server 130 enhances the model's ability to predict and optimize access control structures, align permissions with operational needs, and improve overall security and compliance.

In some embodiments, feature extraction 730 may also involve analyzing hierarchical relationships within the domain. For example, permissions associated with managers may differ from those assigned to their team members. The data management server 130 may extract features based on organizational roles and responsibilities. In some embodiments, hierarchical rules extracted from organizational charts may serve as a basis for grouping and extracting role-based features.

For metadata that includes time-series access activity, the data management server 130 may segment access events into subsets corresponding to defined time periods, such as daily or monthly intervals. Within each subset, features may be generated based on access activity distributions, such as the concentration of access during specific time frames or the diversity of accessed resources.

In some embodiments, feature extraction 730 may include extracting features from graph-based models of access activity that are discussed in FIG. 2 through FIG. 6D. Using an access control graph, the data management server 130 may identify relationships between resource nodes, application account nodes, and named entities. Features derived from such graphs may include measures of centrality, clustering, and connectivity, which provide insights into the structural patterns of access within the domain.

Continuing with FIG. 7, in some embodiments, the data management server 130 may input 740 the features into a machine learning model to identify an automatically-generated access-control group that includes a set of one or more named entities. For example, an automatically-generated access-control group is determined based on the access activity data of the one or more named entities. An automatically-generated access-control group is different from a domain-defined group. An automatically-generated access-control group is automatically identified by the data management server 130 using algorithms and/or machine learning models. A domain-defined group is a group that is defined by a domain such as an organization. For example, a legal department may be a domain-defined group while a set of individuals who have similar access activities to a particular protected dataset may be automatically identified by the data management server 130 using the process 700. Those individuals in the set may not share common attributes other than access activities and may not come from the same department in an organization.

The machine learning model processes the extracted features, such as frequency of access, recency of access, resource usage patterns, and role-based information, to group named entities with similar access behaviors. In some embodiments, clustering algorithms 870 may be used to identify logical groupings. Each cluster may represent an access-control group with a shared set of permissions and behaviors. An automatically-generated access-control group may be identified as one of the cluster and the data management server 130 may evaluate the validity of the grouping by examining whether such grouping aligns with the principle of least privilege.

Named entities may then be grouped into clusters based on the similarity of access activity data. This similarity may be determined based on factors such as access patterns, permissions, the frequency, type, and distribution of access permissions. One of the clusters is assigned as the automatically-generated access-control group.

In various embodiments, any suitable unsupervised machine learning algorithms 872, such as k-means clustering, hierarchical clustering, community clustering may be used to identify potential automatically-generated access-control groups. These algorithms analyze extracted features, such as access frequency, recency, and shared resource usage, to detect patterns and logical groupings among named entities. The data management server 130 may focus on the relationships between application accounts, permissions used, and resource instances. In some embodiments, hierarchical clustering may reveal nested groupings that reflect organizational hierarchies or dependencies, while community clustering may highlight tightly-knit subgroups within a broader network of interactions.

The choice of algorithm may depend on the complexity of the dataset, the relationships among named entities, and the desired granularity of the resulting groups. For example, k-means clustering may be used for datasets where between separations between groups exist, while hierarchical clustering may be more effective for identifying access groups with overlapping or hierarchical relationships. In some embodiments, community clustering is used graph-based datasets, such as access control graphs, where named entities, resources, and permissions are represented as interconnected nodes and edges. The community clustering algorithm (e.g., Louvain) evaluates the connectivity within a group (e.g., frequent access by users to a shared resource) and contrasts it with the connectivity to nodes outside the group. Connectivity may be defined in various manner, such as actual connections between users, access activities to similar data resources as a metric of connectivity, etc.

In some embodiments, the results of the user group clustering 870 may be validated to determine whether the grouping aligns with the principle of least privilege. The data management server 130 may evaluate whether the permissions associated with each access-control group are appropriately limited to the minimum required for their operational needs. Groups with excessive permissions or overly broad access may be flagged for refinement or further analysis. This iterative process improves security and efficiency of automatically-generated access-control groups while reducing risks of overprivileged access.

In some embodiments, the data management server 130 may also apply role mining techniques to the identification of automatically-generated access-control groups. By analyzing patterns of permissions and access activity, the machine learning model may uncover roles that align with access behaviors. For example, the model may identify a role representing a "data analyst" group based on common access patterns to specific data resources and tools.

Continuing with FIG. 7, in some embodiments, the data management server 130 may determine 750 an access control rule for the automatically-generated access-control group based on the access activity data of the set of one or more named entities. The data management server 130 may analyze patterns in access activity data to establish rules that govern the permissions for the automatically-generated group. The rules may align with the principle of least privilege. For example, if data management server 130 determines that individuals in an automatically-generated access-control group do not need access to a data resource or a class of data resources while the domain-defined rule has granted those individuals the access rights, the data management server 130 may automatically generate an access control rule that revokes the access right of those individuals based on the principle of least privilege. Alternatively, the data management server 130 may generate a temporal restriction to the individuals in the identified group.

By analyzing the access data, the data management server 130 may identify various utilization patterns, insights, and dormant factors 850. For example, the data management server 130 may identify dormant user groups, dormant roles, and dormant permissions. The way to identify dormant factors are further discussed in FIG. 4 through FIG. 6D. A dashed line in an access graph, such as the one shown in FIG. 6D, represents one of the identified dormant factor.

Continuing with FIG. 7, in some embodiments, the data management server 130 may determine 750 an access control rule using a machine learning model. The machine learning model may be a different model compared to the clustering model. For example, after clustering, the data management server 130 may identify the access control rule using another machine learning model to determine rules that are aligned with the principle of least privilege for an identified cluster. Alternatively, or additionally, the data management server 130 may use rule-based or heuristic algorithms to determine access rules. In some embodiments, the data management server 130 may directly determine access control rules of a particular individual without performing any clustering in step 740, such as by directly applying a machine learning model to features of a target individual. In such embodiments, the automatically-generated access-control group has only a single individual.

In some embodiments, to determine or refine an access control rule, the data management server 130 may apply anomaly detection techniques to identify anomaly activities 860. The data management server 130 may establish baseline patterns of access activity for named entities based on historical data. Deviations from these baselines may be identified as anomalies. For example, if a named entity accesses a data resource it has never accessed before or exhibits a sudden increase in access frequency, this deviation may trigger further analysis to ensure compliance with the principle of least privilege.

By way of example, in identifying anomaly activities 860, the data management server 130 may establish baseline patterns of access activity for the named entities by analyzing historical data to identify typical access behaviors and trends. These baseline patterns serve as reference models for normal access activities within the domain. The data management server 130 compares the current access activity data of the named entities to the established baseline patterns. Through this comparison, the data management server 130 identifies deviations from the baseline patterns, which are flagged as anomalies. These anomalies may indicate unusual or potentially unauthorized access behaviors. Based on the identified anomalies, the data management server 130 determines an access control rule tailored to address the detected deviations. This rule is then applied to the automatically-generated access control group to ensure that access permissions remain aligned with organizational security policies and the principle of least privilege. By leveraging anomaly detection, the data management server 130 enhances the precision and adaptability of access control management.

In some embodiments, the data management server 130 may also use role mining techniques to determine access control rules. Role mining involves analyzing patterns of access permissions to identify common roles associated with named entities. The data management server 130 may group permissions into roles and assign these roles to the access-control group. For example, if several named entities regularly access a shared set of resources, a role encapsulating these permissions may be created and associated with the group.

Additional considerations in determining the access control rule may include hierarchical permissions and sensitivity levels of resources. In some embodiments, permissions are structured hierarchically, where broad permissions encompass narrower, more specific permissions. For example, an "Admin" permission may include "Read" and "Write" permissions. The data management server 130 may determine the most appropriate level of access for the group, ensuring that permissions align with the access activity data while minimizing overprivileged access. The data management server 130 may also integrate context from organizational structures and domain-specific rules. For instance, hierarchical rules extracted from an organization's reporting structure may inform the scope of the access control rule. If a named entity belongs to a department with restricted access to sensitive resources, the data management server 130 may factor this restriction into the rule.

In some embodiments, the data management server 130 may perform iterative evaluations. In some embodiments, the data management server 130 evaluates the proposed rule against domain-defined rules and adjusts based on feedback or new data. This iterative process may include testing the rule against a simulated dataset to predict its effectiveness in reducing overprivileged access and enhancing security.

In some embodiments, the determined access control rule is stored in an access control graph, where relationships between named entities, resources, and permissions are represented as nodes and edges. This graph-based representation facilitates comparison and alignment with existing domain-defined rules, supporting downstream processes such as recommendation generation.

Continuing with FIG. 7, in some embodiments, the data management server 130 may compare 760 the access control rule for the automatically-generated access-control group to a domain-defined access rule associated with a domain-defined grouping to which one of the named entities in the set belongs. The data management server 130 compares newly derived access control rule against pre-existing access rules established within the domain to identify discrepancies or alignments. For example, for an employee under a department, the employee may be subject to one or more domain-defined access rules. The data management server 130 may automatically assign the employee to one of the automatically-generated access-control groups and generate one or more access control rules for the automatically-generated group. The data management server 130 may compare the newly generated access control rules to the preexisting rules in the organization to determine whether adjustment should be recommended to the organization.

In some embodiments, the domain-defined access rules may include hierarchical and granular permission sets associated with specific roles or organizational units. For example, a domain-defined rule may specify that employees in a marketing department can only access shared resources within their department, such as campaign databases, but are restricted from accessing engineering or financial resources.

To perform the comparison, the data management server 130 may utilize an access control graph, where relationships between named entities, resources, and permissions are modeled as nodes and edges. The data management server 130 may traverse the graph to identify the domain-defined access rule for each named entity in the automatically-generated access-control group and juxtapose it against the newly created rule. This traversal may involve evaluating paths that connect named entities to resources via permissions.

In some embodiments, the comparison process may focus on detecting conflicts or redundancies. For instance, the data management server 130 may identify scenarios where the automatically-generated access control rule grants broader permissions than those allowed by the domain-defined rule. Conversely, the process may also highlight restrictions in the new rule that unnecessarily limit access compared to the domain-defined grouping.

The comparison may also incorporate additional metadata associated with domain-defined rules. For example, hierarchical structures, such as organizational charts, may define cascading rules, where permissions granted to higher levels propagate downward. The data management server 130 may analyze whether the automatically-generated rule respects these cascades or deviates from the intended hierarchy.

To enhance accuracy and relevance, the comparison may account for contextual factors such as access patterns, resource sensitivity levels, and recent security incidents. For instance, if a named entity's access activity indicates a valid need for broader permissions, the data management server 130 may flag the domain-defined rule as potentially outdated or overly restrictive.

In some embodiments, statistical methods or machine learning models may aid the comparison process. For example, clustering algorithms may group similar access control rules to identify outliers or anomaly activities 860. If the automatically-generated rule significantly deviates from clustered patterns of domain-defined rules, this may signal a potential misalignment requiring further review.

Continuing with FIG. 7, in some embodiments, the data management server 130 may generate 770, based on comparing the access control rule to the domain-defined access rule, a recommendation 880 on changing access privileges of one or more named entities in the set. The data management server 130 proposes actionable changes aimed at optimizing access control and adhering to the principle of least privilege.

The recommendations 880 may address various scenarios, such as overprivileged access, redundant permissions, or restrictive rules that hinder necessary operations. For instance, if the automatically-generated access control rule suggests narrower permissions than the domain-defined rule, the data management server 130 may suggest revoking certain privileges to align with the principle of least privilege. Conversely, if the domain-defined rule appears overly restrictive compared to validated access patterns, the data management server 130 may recommend granting additional permissions to enhance operational efficiency.

In some embodiments, the recommendation process includes identifying specific changes to access privileges for named entities. These changes may include updates to group memberships, roles, or direct permissions. For example, the data management server 130 may suggest reassigning a named entity from an outdated access-control group to a newly optimized group with permissions that more accurately reflect their access needs.

To enhance the accuracy and relevance of the recommendations 880, the data management server 130 may incorporate historical access data, contextual metadata, and organizational policies. For instance, if a named entity consistently accesses a resource that falls outside the current permissions, the data management server 130 may recommend updating the access privileges to include the resource. Similarly, metadata such as resource sensitivity levels or user roles may guide recommendations to ensure compliance with security policies.

In some embodiments, the data management server 130 may also generate a detailed implementation plan for the recommendations 880. This plan may include a step-by-step guide for executing the proposed changes, such as modifying user group memberships, adjusting permissions, or updating role assignments, the implementation plan may outline potential risks or dependencies associated with each recommendation, enabling administrators to make informed decisions.

The recommendations 880 generated by the data management server 130 may be used for various purposes, from allowing an organization to adjust certain access control rules, bringing least privilege model to the organization, to continuously and autonomously updating data access rules and permissions, such as on a daily basis. For example, adjusting access control rules may involve identifying redundant or unused permissions based on the access graph and generating recommendations to clean up these inefficiencies. If a data resource is consistently accessed by only a subset of users within a domain, the data management server 130 might suggest splitting the group or revoking access for users who do not need the access. Similarly, the data management server 130 may highlight overly broad permissions, such as an "Admin" role being assigned to users who only require "Read" and "Write" access, and propose more restrictive permissions aligned with actual usage patterns. The recommendations may be presented in an access control graph illustrated in FIG. 2 through FIG. 6D, such as when an administrator reviews the access control graph of a particular individual, the data management server 130 may provide a recommendation to adjust the permissions granted to the individual. Based on approval or rejection from the domain, the data management server 130 may adopt access control rules on behalf of the domain or may transmit the access control rules to data sources or third-party SaaS platforms to carry out the adoption.

The data management server 130 may also use the recommendations 880 to bring a least privilege model to the organization, such as recommending access-control groups and permissions that grant users only the minimum access necessary to perform their tasks. The least privilege model may limit an individual's data access permission by role, by time, and by other rules and situations. For example, if the data management server 130 determines that an individual only access a data resource at a certain time of the month, the data management server 130 may suggest invoking access to the data resource in other times when the individual does not use the data.

In some embodiments, the data management server 130 may also use the process 700 to continuously and autonomously update data access rules and permissions. For example, the process 700 may become a self-feedback loop for the data management server 130 to autonomously implement and adjust access control rules periodically, such as on a daily basic. The data management server 130 may analyze daily access activity logs and compare the logs against existing rules. For instance, if an employee transitions to a new role within the organization and the access patterns shift accordingly, the data management server 130 could automatically suggest or implement permission updates to align with their new responsibilities. Similarly, the data management server 130 might detect anomaly activities 860, such as a user suddenly accessing resources outside their typical scope, and recommend temporary access restrictions pending further review. This dynamic and ongoing refinement ensures that access rules remain aligned with organizational policies and evolving operational needs.

To ensure ongoing compliance and adaptability, the data management server 130 may include recommendations for continuous monitoring and iterative refinement of the access control structure. For instance, the data management server 130 may suggest periodic reviews of access activity data to validate the effectiveness of implemented changes and identify new optimization opportunities.

In some embodiments, the recommendations 880 provided by the data management server 130 can be reactive or predictive. Reactive recommendations may include adjustments to access control rules in response to specific events, such as cyber security incidents, or after analyzing access data to identify inefficiencies or security risks. For instance, if an unauthorized access attempt is detected or a security incident occurs, the data management server 130 may recommend revoking certain permissions, modifying group memberships, or strengthening access policies for affected resources. Similarly, after periodic access reviews, the data management server 130 might suggest cleaning up unused permissions or consolidating redundant roles to improve security and reduce complexity.

Predictive recommendations may anticipate future access needs or risks and propose access rules proactively. For example, when a new employee joins an organization, the data management server 130 may analyze their job role, department, and access patterns of similar employees to recommend an initial set of permissions or group memberships. In some embodiments, the data management server 130 may determine the cluster to which the employee belongs and recommends access control rules accordingly. Additionally, the data management server 130 can identify emerging trends, such as an increase in access requests for a specific resource, and suggest preemptive adjustments to access rules to ensure operational continuity while maintaining security.

In some embodiments, the recommendation process is supported by an access control graph illustrated in FIG. 2 through FIG. 6D, which provides a visual representation of the current and proposed access control structures. This graph-based approach enhances transparency and facilitates collaboration among stakeholders by clearly illustrating the relationships between named entities, resources, and permissions.

Access Control Generation Architecture

Figure 9:
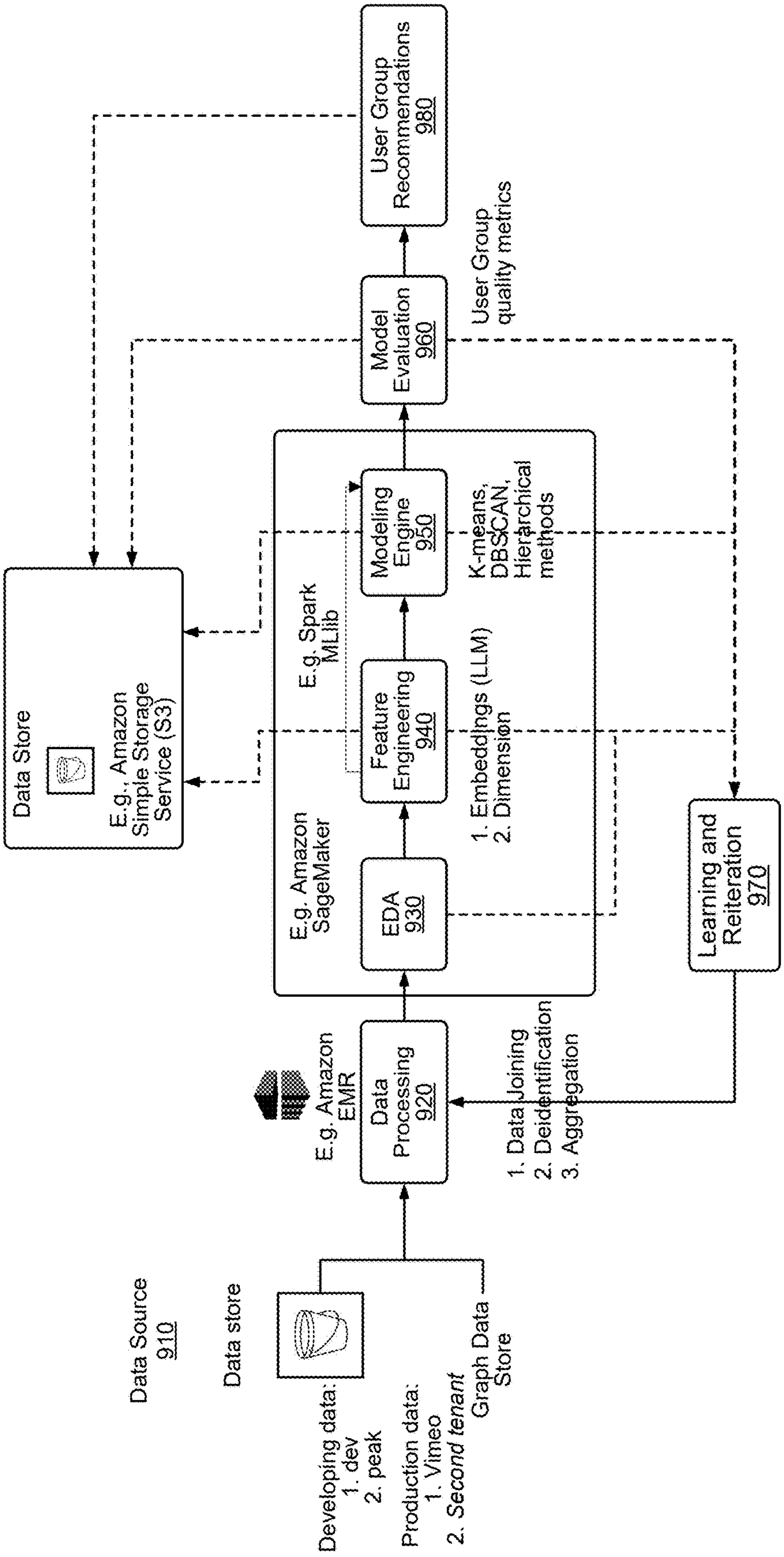
FIG. 9 is a block diagram illustrating an example computer architecture for generating access control rules and recommendations, in accordance with some embodiments.

FIG. 9 is a block diagram illustrating an example computer architecture for generating access control rules and recommendations, such as for process 700, in accordance with some embodiments. The computer architecture may be represented by the pipeline 900.

In some embodiments, the pipeline 900 may include one or more data sources 910. The data sources 910 may include a graph database that stores graph objects, such as data store 242. Another example of a data source 910 may be a metadata store. Other examples of data stores are discussed in FIG. 2. Data sources 910 includes databases designed to store and manage activity graphs and metadata repositories. These activity graphs represent a structured depiction of user activities, data access events, and access patterns within a domain. The metadata repositories store various types of metadata that are discussed in step 710 of the process 700.

In some embodiments, the pipeline 900 may include a data processing engine 920. The data processing engine 920 performs various types of preprocessing of the data for subsequent analysis by applying techniques such as data joining, de-identification and aggregation. Data joining include aggregation of data to combine data from multiple sources to create normalized data. Additional detail is discussed in FIG. 2. De-identification includes removing sensitive data and anonymizing personally identifiable information, safeguarding privacy and compliance with data protection regulations.

Figure 10:
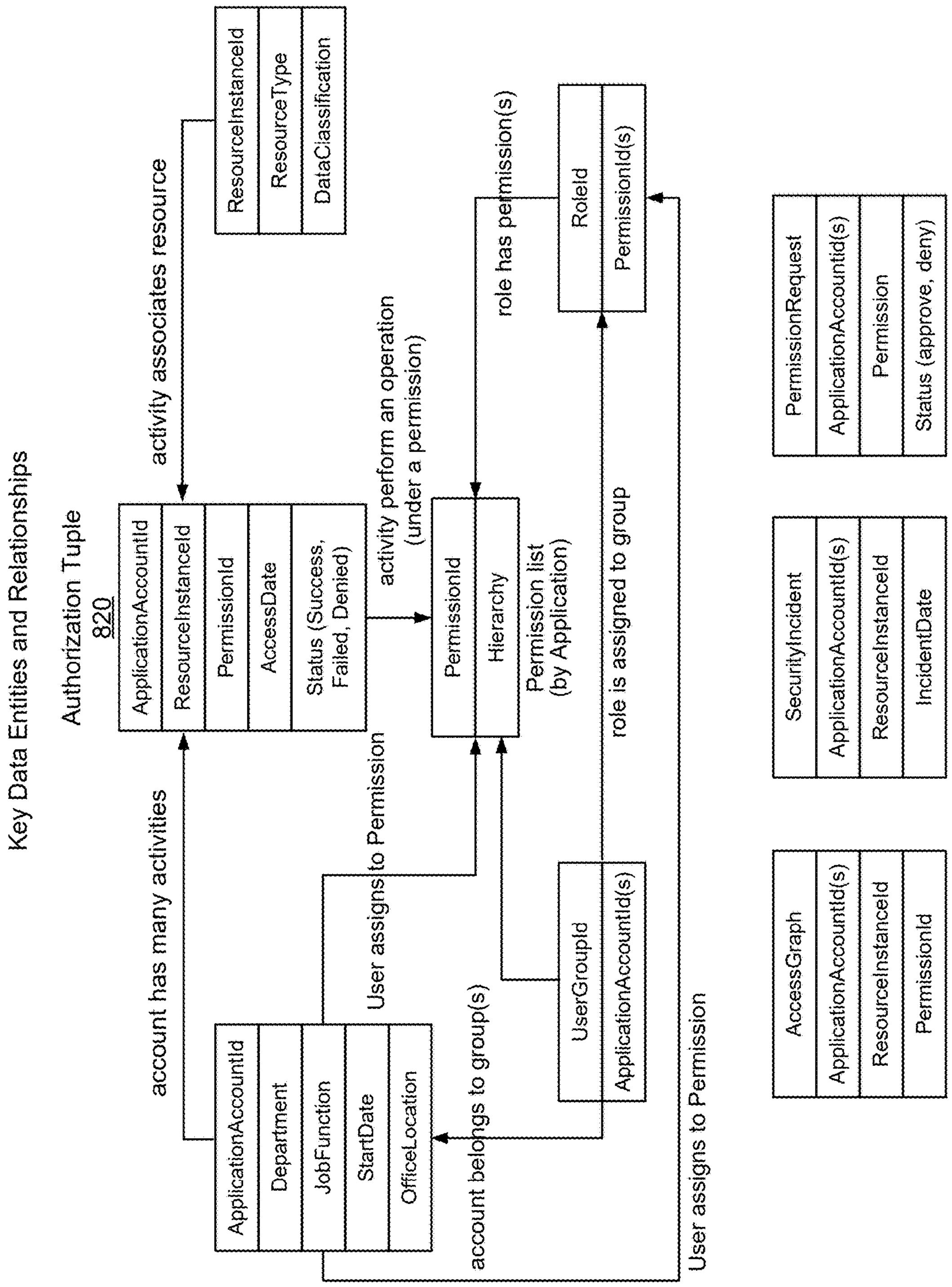
FIG. 10 is a block diagram illustrating an example schema that may be used for access control analysis, in accordance with some embodiments.
Figure 11:
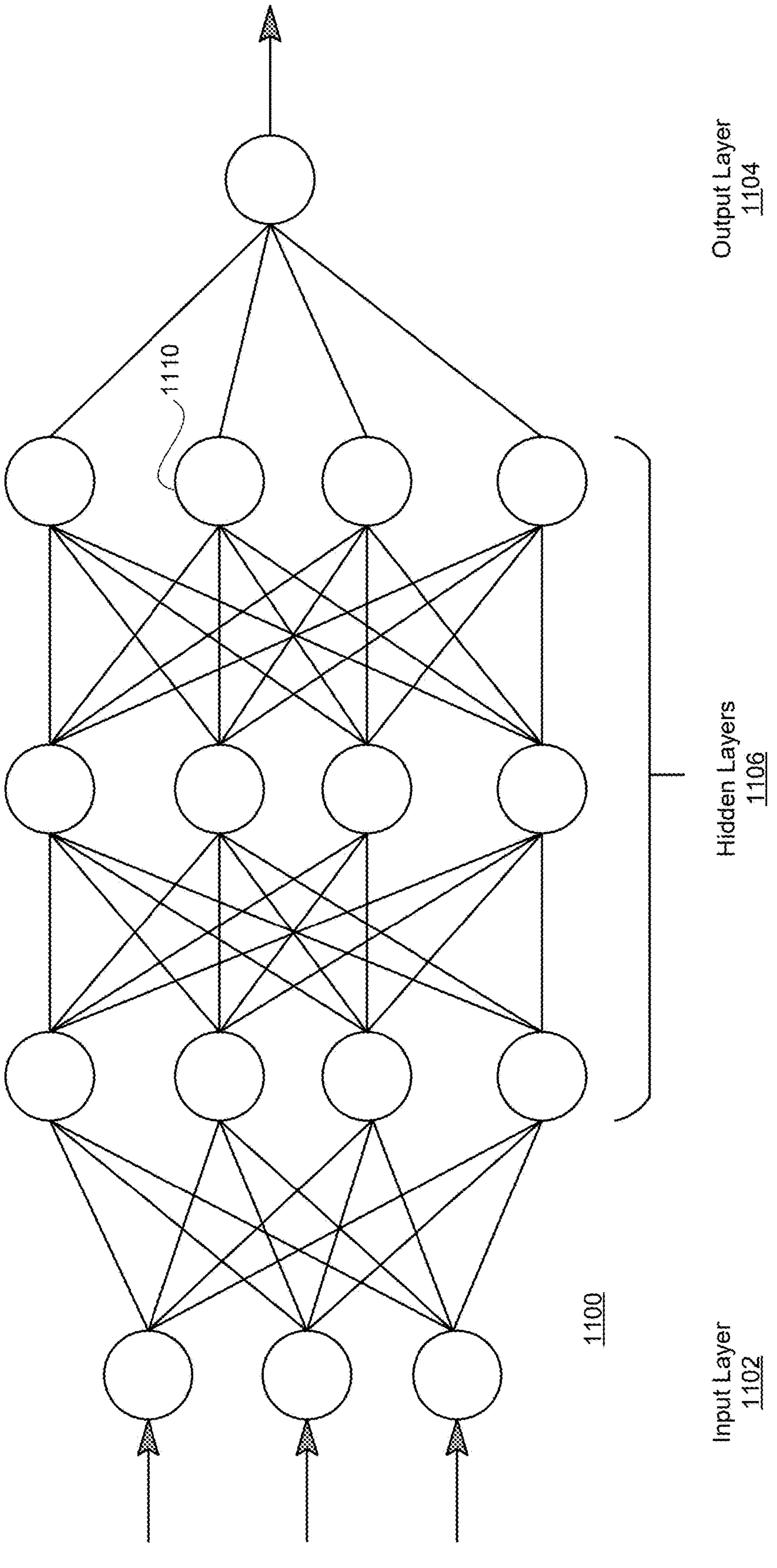
FIG. 11 is a block diagram illustrating an example machine learning model, in accordance with some embodiments.

In some embodiments, the data management server 130, in processing data from various sources, may convert and normalize the data based on one or more predefined data schema. FIG. 10 is a block diagram illustrating an example schema that may be used for access control analysis. FIG. 3 provides another example of data schema. The data management server 130 relies on various types of data, such as data objects from access graphs, security incident data, and permission requests and results. An authorization tuple 820 is defined based on accounts, roles, user groups, resource instances, and access activities, as illustrated in FIG. 10.

Continuing with FIG. 9, in some embodiments, the pipeline 900 may include an exploratory data analysis (EDA) 930. In performing EDA, the data management server 130 conducts an initial examination of the data to assess its quality, uncover distributions, and identify potential anomalies. The 930 may include generating summary statistics, visualizations, and other exploratory techniques to ensure the dataset is suitable for modeling and feature extraction.

In some embodiments, the pipeline 900 may include feature engineering 940. Feature engineering 940 involves selecting and transforming data attributes to create meaningful features for inputs of one or more machine learning models. Additional detail is descripted in feature extraction 730 in the process 700. The data management server 130 identifies and constructs features that represent key aspects of user behaviors, resource interactions, and access patterns. These engineered features enhance the predictive power of statistical and machine learning models by encapsulating critical relationships and patterns within the dataset. The feature engineering 940 may also include generating embeddings for large language models and performing dimensional reduction, as described in steps 720 and 730 in the process 700.

In some embodiments, the pipeline 900 may include an analysis and modeling engine 950. This component applies statistical and machine learning algorithms to model the data and uncover actionable insights. The models are designed to analyze access patterns, identify redundancies, and detect opportunities for optimization. By leveraging techniques such as clustering, role mining, and anomaly detection, the analysis and modeling module provides a data-driven basis for recommending changes to user group structures. These insights support the implementation of the principle of least privilege while ensuring the domain's scalability and security.

In some embodiments, the pipeline 900 may include a model evaluation engine 960. The data management server 130 assesses the performance and effectiveness of the machine learning models by calculating metrics such as precision, recall, and overall accuracy. The data management server 130 may also evaluate the practical value and benefits of the recommendations 880. The data management server 130 may evaluate whether the recommendations 880 align with organizational objectives, regulatory requirements, and/or the principle of least privilege. The model evaluation process provides a feedback loop for validating and refining the analytical approach, ensuring continuous improvement and alignment with security and operational goals.

By way of example, the evaluation process may include defining evaluation metrics tailored to measure access control rules' alignment with security principles, including the principle of least privilege. Examples of these metrics may include assessing overprivileged access, overlapping group assignments, group proliferation, out-of-scope activities, and weighted structural complexity. Additionally, perturbation metrics are used to evaluate the level of effort required to transition from the current structure to an optimized configuration. The data management server 130 may also evaluate scalability considerations to determine whether the machine learning model has the capability to process large datasets, such as those containing millions of permissions.

The evaluation process applies the evaluation metrics to assess the accuracy and utility of the generated recommendations and evaluate whether permissions are excessively granted or inappropriately restricted. The metrics also account for robustness and stability, analyzing how susceptible the recommendations are to changes over time. Further, precision, recall, and overall accuracy are calculated to ensure the optimization retains original permissions while avoiding unnecessary assignments. The evaluation may validate the model's effectiveness and provide actionable insights for iterative refinements, fostering a secure, efficient, and scalable access control framework.

In some embodiments, the pipeline 900 may include a learning and reiteration engine 970. The data management server 130 supports iterative refinement of the pipeline 900 by revisiting earlier steps in light of new insights and feedback. Adjustments to features, machine learning models, and evaluation criteria are made to improve outcomes and adapt to changing organizational needs. By enabling continuous learning and refinement, the learning and reiteration engine 970 ensures that the pipeline 900 remains dynamic and responsive. In some embodiments, the learning and reiteration engine 970 allows continuous access control group and rule determination in an autonomous fashion, such as entirely or partially autonomous control by the data management server 130 to adjust access control rules and policies of an organization. The adjustment may be made dynamically and periodically such as on a daily basis.

The learning and reiteration engine 970 incorporates new datasets to generalize findings across broader contexts, ensuring the adaptability of models to different environments or customer datasets. The learning and reiteration engine 970 may also refine the machine learning models based on evaluation results to enhance alignment with security objectives such as least privilege. For example, findings related to overprivileged access, dormant user groups, or excessive permissions can be incorporated to adjust model parameters and refine the underlying access structures. This iterative refinement ensures that the pipeline dynamically adapts to organizational changes, improving the domain's security over time.

In some embodiments, the learning and reiteration engine 970 may facilitate continuous learning in live environments by applying updated business contexts, data classifications, or operational parameters. By leveraging iterative processes, the learning and reiteration engine 970 ensures the access control structure evolves alongside changing organizational requirements, maintaining its relevance and effectiveness. The learning and reiteration engine 970 may integrate insights from model evaluation 960 and generalization processes to produce sustainable, data-driven recommendations that enhance the security posture while supporting operational efficiency.

In some embodiments, the pipeline 900 may include a user group recommendation engine 980. The user group recommendation engine 980 generates actionable recommendations 880 for optimizing user group structures, roles, and permissions. By analyzing usage patterns and identifying inefficiencies, the user group recommendation engine 980 proposes changes that enhance security, streamline access management, and align with the principle of least privilege.

The recommendations may include detailed implementation plans and monitoring strategies, ensuring that the proposed changes are both practical and sustainable. In some embodiments, the recommendations 880 may include comprehensive reports. The reports may outline the optimized user group structures, accompanied by the rationale for proposed changes, the anticipated benefits, and a detailed implementation plan.

The user group recommendation engine 980 may also define a process for ongoing monitoring, periodic reviews, and continuous optimization of user group configurations to ensure alignment with organizational security policies and operational goals.

In some embodiments, examples of recommendations 880 may include: (1) an optimized list of user groups and corresponding application account memberships, highlighting user groups with no recent activities; (2) proposed changes to roles, including identification of roles with no recent activities; (3) modifications to permissions associated with each role, including a detailed list of permissions with no recent activities; (4) a list of anomaly activities requiring further investigation; and (5) a validated set of results to ensure accuracy and reliability.

The recommendation process may further involve analyzing these data across additional datasets and multiple tenants to validate findings over time. Once validated, the logic and insights derived from the analysis may be integrated into the data management server 130 for workflow processing, enabling automated updates and maintenance of the access control system.

The user group recommendation engine 980 may generate output data in various formats, such as (1) a list of user groups and membership changes in CSV or JSON format; (2) a list of roles and permissions changes in CSV or JSON format; and (3) additional information regarding optimization scores, metrics, and other relevant insights. These outputs are configured to facilitate actionable implementation and further analysis by stakeholders or automated systems.

In some embodiments, the permissions controlled or recommended by the data management server 130 may include various fine-grained permissions. Below are examples of various permissions that can be recommended by data management server 130. These fine-grained permissions enable various use cases of cyber security and data management that are subjects of claims of this disclosure. The fine-grained permission examples include: organization permissions for administration, blocking users, custom organization roles, custom properties, events, GitHub copilot business, members, organization Codespaces secrets, organization Codespaces settings, organization Codespaces, organization Dependabot secrets, personal access token requests, personal access tokens, projects, secrets, self-hosted runners, team discussions, variables, and webhooks, additionally, repository permissions may include actions, administration, attestations, checks, code scanning alerts, Codespaces lifecycle admin, Codespaces metadata, Codespaces secrets, Codespaces, commit statuses, contents, custom properties, Dependabot alerts, Dependabot secrets, deployments, environments, issues, metadata, pages, projects, pull requests, repository security advisories, secret scanning alerts, secrets, variables, webhooks, and workflows, user permissions may include block another user, Codespaces user secrets, email addresses, followers, GPG keys, Gists, GIT SSH keys, interaction limits, notifications, plan, profile, SSH signing keys, starring, and watching, these permissions collectively support the detailed access control and security management capabilities facilitated by the data management server 130.

Example Machine Learning Models

In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNNs), recurrent neural networks (RNNs), long short-term memory networks (LSTMs), transformers, and linear recurrent neural networks such as Mamba may also be used. For example, various access control patterns identification, clustering tasks to identify automatically-generated access control groups, and other processes may apply one or more machine learning and deep learning techniques.

In various embodiments, the training techniques for a machine learning model may be supervised, semi-supervised, or unsupervised. In supervised learning, the machine learning models may be trained with a set of training samples that are labeled. For example, for a machine learning model trained to detect anomalies in access control data, the training samples may be records of past access activities with labeled normal and anomalous behaviors. The labels for each training sample may be binary or multi-class. For a machine learning model trained to identify access control patterns, the training samples may be records of historical access data paired with the corresponding roles or permissions granted to users. The labels for each training sample may be binary or multi-class. In training a machine learning model for recommendation generation, the training labels may include a positive label that indicates a recommended access pattern and a negative label that indicates anomalous or non-recommended patterns. In some embodiments, the training labels may also be multi-class such as different risk levels for access activities (e.g., low, medium, and high risk).

By way of example, the training set may include multiple past records of access activity data with known outcomes. Each training sample in the training set may correspond to a past record, and the corresponding outcome may serve as the label for the sample. A training sample may be represented as a feature vector that includes multiple dimensions. Each dimension may include data of a feature, which may be a quantized value of an attribute that describes the past record. For example, in a machine learning model that is used to identify role-based access control patterns, the features in a feature vector may include frequency of resource access, recency of access, type of resource accessed, etc. In various embodiments, certain pre-processing techniques may be used to normalize the values in different dimensions of the feature vector.

In some embodiments, an unsupervised learning technique may be used. The training samples used for an unsupervised model may also be represented by feature vectors but may not be labeled. Various unsupervised learning techniques such as clustering may be used in determining similarities among the feature vectors, thereby categorizing the training samples into different clusters. In some cases, the training may be semi-supervised with a training set having a mix of labeled samples and unlabeled samples.

A machine learning model may be associated with an objective function, which generates a metric value that describes the objective goal of the training process. The training process may intend to reduce the error rate of the model in generating predictions. In such a case, the objective function may monitor the error rate of the machine learning model. In a model that generates predictions, the objective function of the machine learning algorithm may be the training error rate when the predictions are compared to the actual labels. Such an objective function may be called a loss function. Other forms of objective functions may also be used, particularly for unsupervised learning models whose error rates are not easily determined due to the lack of labels. In some embodiments, in access control pattern identification, the objective function may correspond to minimizing the error in classification accuracy and identifying invalid access patterns. In various embodiments, the error rate may be measured as cross-entropy loss, L1 loss (e.g., the sum of absolute differences between the predicted values and the actual values), L2 loss (e.g., the sum of squared distances).

Referring to FIG. 10, a structure of an example neural network is illustrated, in accordance with some embodiments. The neural network 1000 may receive an input and generate an output. The input may be the feature vector of a training sample during the training process or the feature vector of an actual case during inference. For access control pattern identification, the feature vector may include attributes such as frequency of access, recency of access, types of accessed resources, access durations, and corresponding user roles. The output of the neural network may include predictions, classifications, or other determinations, such as identifying whether a specific access control pattern is valid or invalid.

The neural network 1000 may include different types of layers, such as convolutional layers, pooling layers, recurrent layers, fully connected layers, and custom layers. A convolutional layer convolves the input (e.g., a matrix representation of feature vectors) with one or more kernels to extract patterns from the data, generating feature maps that capture relevant characteristics. For example, in the context of access control, these patterns could represent frequently occurring resource accesses by certain roles. Each convolution result may be passed through an activation function to introduce non-linearity, enabling the neural network to model complex relationships. A convolutional layer may be followed by a pooling layer that reduces the spatial size of the feature maps, such as selecting the maximum value (max pooling) or average value (average pooling) over a given region. These layers work together to enhance computational efficiency and robustness to small variations in the input data.

In some embodiments, a recurrent layer may follow a pair of convolutional and pooling layers to capture sequential or temporal relationships, such as identifying changes in access behaviors over time. Fully connected layers, positioned later in the network, aggregate features extracted by earlier layers and are typically used for classification tasks. For example, these layers could classify access patterns as valid, invalid, or anomalous based on the extracted features. In some cases, custom layers may also be included to address specific tasks, such as grouping users into roles or visualizing patterns of access in a hierarchical structure.

The architecture of the neural network 1000 may vary in terms of the number, order, and types of layers used. In some embodiments, certain layers may be omitted, or additional custom layers may be added to address specific requirements of access control pattern identification. For example, convolutional layers might use kernel sizes optimized for the data's dimensions (e.g., 3x3 or 5x5), while recurrent layers may leverage specialized gates, such as those found in long short-term memory (LSTM) networks, to capture temporal relationships effectively.

A machine learning model, such as the neural network 1000, may be trained through iterative processes that include forward propagation and backpropagation. Each layer in the neural network may include one or more nodes that are fully or partially connected to nodes in adjacent layers. During forward propagation, the neural network computes outputs for each layer based on the outputs of preceding layers and the corresponding weights, biases, and activation functions.

For example, a training set may include records of user access activities along with their associated roles or permissions. Each training sample in the dataset may be labeled as representing a valid or invalid access control pattern. The neural network processes each sample, and the output predictions are compared to the actual labels using an objective function, such as cross-entropy loss. This loss value quantifies the discrepancy between the predicted and actual outcomes and serves as a basis for updating the model's parameters during backpropagation.

In backpropagation, error terms are calculated based on the loss function and are propagated backward through the network to adjust the weights and biases of each node. This adjustment process typically involves optimization algorithms, such as stochastic gradient descent (SGD), to iteratively minimize the loss function and improve the model's accuracy. Training continues over multiple iterations until the objective function stabilizes (e.g., the model converges) or a predetermined number of training epochs is reached.

In some embodiments, the trained machine learning model for access control pattern identification may undergo periodic re-training to ensure its effectiveness in evolving environments, as described in model evaluation engine 960 and learning and reiteration engine 970 in FIG. 9. Re-training may involve incorporating additional training data, such as new records of access activities reflecting updated roles, permissions, or access policies. For instance, as organizations adopt new resource classifications or roles, the model can be updated to include these changes, thereby maintaining its relevance.

The re-training process may also involve generating synthetic data based on patterns observed in the existing dataset to enhance the diversity and coverage of training samples. This additional training data is used to refine the model's weights and biases, ensuring that it adapts to new trends in access control while preserving its ability to identify existing patterns accurately.

The continuous learning process may leverage a use-retraining cycle, wherein the model's performance is monitored during deployment, and new data is periodically collected and used to re-train the model. For example, a deployed model may identify potential inefficiencies in current access control policies, and these insights may be incorporated into subsequent training iterations to further optimize its predictions.

Computing Machine Architecture

Figure 12:
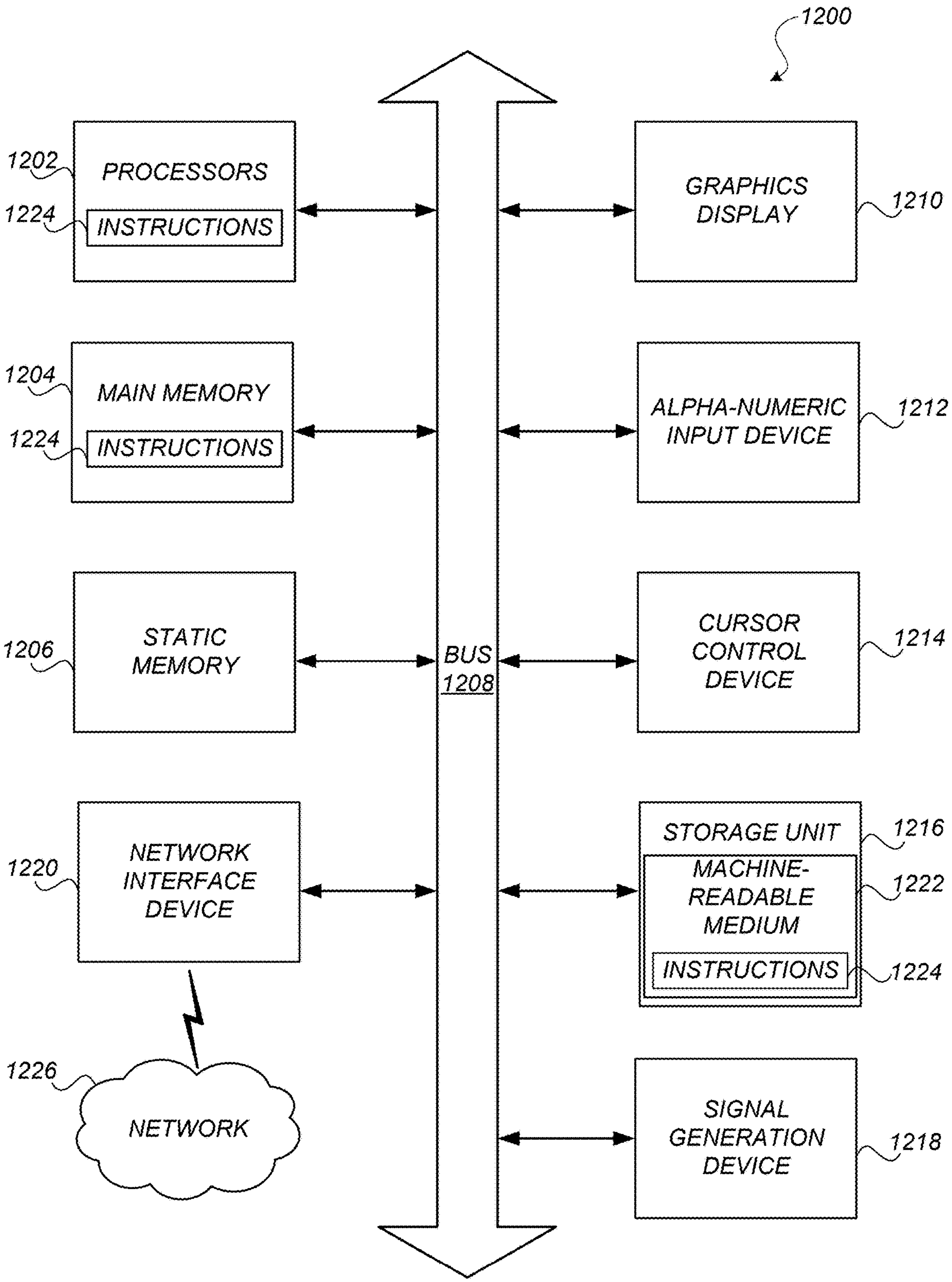
FIG. 12 is a block diagram illustrating components of an example computing machine, in accordance with some embodiments.

FIG. 12 is a block diagram illustrating components of an example computing machine that is capable of reading instructions from a computer-readable medium and executing them in a processor (or controller). A computer described herein may include a single computing machine shown in FIG. 12, a virtual machine, a distributed computing system that includes multiple nodes of computing machines shown in FIG. 12, or any other suitable arrangement of computing devices.

By way of example, FIG. 12 shows a diagrammatic representation of a computing machine in the example form of a computer system 1200 within which instructions 1224 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 12 may correspond to any software, hardware, or combined components shown in FIGS. 1 and 2. While FIG. 12 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1224 that specify actions to be taken by that machine. Further, while only a single machine is illustrated, the terms "machine" and "computer" may also be taken to include any collection of machines that individually or jointly execute instructions 1224 to perform any one or more of the methodologies discussed herein.

The example computer system 1200 includes one or more processors 1202 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 1200 may also include a memory 1204 that stores computer code including instructions 1224 that may cause the processors 1202 to perform certain actions when the instructions are executed, directly or indirectly by the processors 1202. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One or more methods described herein improve the operation speed of the processor 1202 and reduce the space required for the memory 1204. For example, the database processing techniques described herein reduce the complexity of the computation of the processor 1202 by applying one or more novel techniques that simplify the steps in training, reaching convergence, and generating results of the processors 1202. The algorithms described herein also reduce the size of the models and datasets to reduce the storage space requirement for memory 1204.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though the specification or the claims may refer to some processes to be performed by a processor, this may be construed to include a joint operation of multiple distributed processors. In some embodiments, a computer-readable medium comprises one or more computer-readable media that, individually, together, or distributively, comprise instructions that, when executed by one or more processors, cause a processor (including in situation of one or more processors) to perform, individually, together, or distributively, the steps of the instructions stored on the one or more computer-readable media. Similarly, a processor comprises one or more processors or processing units that, individually, together, or distributively, perform the steps of instructions stored on a computer-readable medium. In various embodiments, the discussion of one or more processors that carry out a process with multiple steps does not require any one of the processors to carry out all of the steps. For example, a processor A can carry out step A, a processor B can carry out step B using, for example, the result from the processor A, and a processor C can carry out step C, etc. The processors may work cooperatively in this type of situation such as in multiple processors of a system in a chip, in Cloud computing, or in distributed computing.

The computer system 1200 may include a main memory 1204, and a static memory 1206, which are configured to communicate with each other via a bus 1208. The computer system 1200 may further include a graphics display unit 1210 (e.g., a plasma display panel (PDP), a liquid crystal display (LCD), a projector, or a cathode ray tube (CRT)). The graphics display unit 1210, controlled by the processor 1202, displays a graphical user interface (GUI) to display one or more results and data generated by the processes described herein. The computer system 1200 may also include an alphanumeric input device 1212 (e.g., a keyboard), a cursor control device 1214 (e.g., a mouse, a trackball, a joystick, a motion sensor, or other pointing instruments), a storage unit 1216 (a hard drive, a solid-state drive, a hybrid drive, a memory disk, etc.), a signal generation device 1218 (e.g., a speaker), and a network interface device 1220, which also are configured to communicate via the bus 1208.

The storage unit 1216 includes a computer-readable medium 1222 on which is stored instructions 1224 embodying any one or more of the methodologies or functions described herein. The instructions 1224 may also reside, completely or at least partially, within the main memory 1204 or within the processor 1202 (e.g., within a processor's cache memory) during execution thereof by the computer system 1200, the main memory 1204 and the processor 1202 also constituting computer-readable media. The instructions 1224 may be transmitted or received over a network 1226 via the network interface device 1220.

While computer-readable medium 1222 is shown in an example embodiment to be a single medium, the term "computer-readable medium" should be taken to include a single medium or multiple media (e.g., a centralized or distributed database, or associated caches and servers) able to store instructions (e.g., instructions 1224). The computer-readable medium may include any medium that is capable of storing instructions (e.g., instructions 1224) for execution by the processors (e.g., processors 1202) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, or storage medium, as well. The dependencies or references in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcodes, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method, comprising:

receiving metadata related to data access associated with a domain, the domain including a plurality of named entities;

determining domain-defined groups of the plurality of named entities, each domain-defined group is associated with a domain-defined access rule;

extracting, from the metadata, features associated with the plurality of named entities, wherein at least one feature is associated with access activity data of the named entities accessing data resources associated with the domain;

inputting the features into a machine learning model to identify an automatically-generated access-control group that includes a set of one or more named entities;

determining an access control rule for the automatically-generated access-control group based on the access activity data of the set of one or more named entities;

comparing the access control rule for the automatically-generated access-control group to a domain-defined access rule associated with a domain-defined grouping to which one of the named entities in the set belongs; and generating, based on comparing the access control rule to the domain-defined access rule, a recommendation on changing access privilege of one or more named entities in the set.

2. The computer-implemented method of claim 1, further comprising generating an access control graph from the metadata, the access control graph comprising graph objects, the graph objects comprising:

resource nodes representing data resources associated with the domain;

application account nodes representing application accounts associated with the domain; and access activity data associated with application accounts accessing the data resources, wherein at least one feature inputted into the machine learning model is extracted from the graph objects.

3. The computer-implemented method of claim 2, wherein determining the domain-defined groups comprises:

traversing the access control graph to determine a named entity grouping based on the application account nodes belonging to the named entity and the resource nodes accessed by the named entity.

4. The computer-implemented method of claim 1, wherein determining the domain-defined groups comprises:

extracting domain-defined rules, the domain-defined rules being hierarchical rules that define a hierarchy of the named entities.

5. The computer-implemented method of claim 4, wherein the hierarchical rules are extracted from an organization chart of the domain.

6. The computer-implemented method of claim 1, wherein the metadata comprises a time series of access data, and the access activity data corresponds to access occurrences within a defined time period, the computer-implemented method further comprising:

parsing the time series metadata to identify individual access events associated with the plurality of named entities;

segmenting the access events into subsets corresponding to the defined time period, and deriving access activity features for the machine learning model based on frequency and distribution of access events within the subsets.

7. The computer-implemented method of claim 1, wherein inputting the features into the machine learning model to identify the automatically-generated access-control group comprises:

applying a clustering algorithm to the features associated with the plurality of named entities;

grouping the named entities into clusters based on similarity in access activity data, wherein the similarity is determined based on access patterns and permissions of the plurality of named entities;

assigning one of the clusters as the automatically-generated access-control group.

8. The computer-implemented method of claim 1, wherein extracting, from the metadata, features associated with the plurality of named entities comprises:

performing a frequency analysis on the access activity data to determine how often each named entity accesses a given resource within the domain;

conducting a recency analysis to evaluate time elapsed since each named entity last accessed the resource;

combining results of the frequency analysis and the recency analysis to create weighted access metrics for the named entities; and deriving features from the weighted access metrics for input into the machine learning model.

9. The computer-implemented method of claim 1, wherein extracting, from the metadata, features associated with the plurality of named entities comprises:

performing role mining, the role mining comprising analyzing patterns of access permissions assigned to the named entities;

identifying common access roles based on shared access activity data;

associating the identified access roles with the named entities exhibiting similar access patterns, and generating features that represent the access roles for input into the machine learning model.

10. The computer-implemented method of claim 1, wherein determining an access control rule for the automatically-generated access-control group comprises:

establishing baseline patterns of access activity for the named entities based on historical data;

comparing access activity data of the named entities to the baseline patterns;

identifying deviations from the baseline patterns as anomalies; and determining the access control rule for the automatically-generated access-control group based on the identified anomalies.

11. The computer-implemented method of claim 1, wherein generating the recommendation on changing access privilege of one or more named entities in the set comprises:

implementing an implementation plan, the implementation plan comprising identifying discrepancies between a current access control structure and a least-privilege model;

formulating a set of recommended changes to user group memberships, roles, and access permissions; and suggesting an ongoing monitoring to maintain the least-privilege model.

12. The computer-implemented method of claim 1, further comprising evaluating the machine learning model, evaluating the machine learning model comprising:

defining evaluation metrics to quantify a performance of the machine learning model;

applying the evaluation metrics to assess accuracy of the machine learning model; and iteratively refining the model based on evaluation results to improve an alignment of the machine learning model with a principle of least privilege.

13. The computer-implemented method of claim 12, wherein the evaluation metrics comprises one or more of the following:

overprivileged access by named entities, overlapping group assignments, group proliferation, out-of-scope activities, weighted structural complexity, perturbation to transition to an access control structure, scalability of a proposed recommendation, and/or accuracy in maintaining original access permissions and avoiding extra permission assignments.

14. The computer-implemented method of claim 1, further comprising performing reiteration of the machine learning model, the reiteration comprising:

utilizing findings gained from a model evaluation that refines the machine learning model;

applying additional datasets to generalize the findings;

adjusting feature extract and the model evaluation that based on changes in the domain; and repeating iteratively to maintain refine an access control structure of the domain over time.

15. The computer-implemented method of claim 1, wherein generating the recommendation on changing access privilege of one or more named entities in the set comprises:

providing a user group recommendation, the user group recommendation comprising identifying user groups with inactive members or excessive permissions;

proposing changes to user group access permissions to align with the group access permissions with a principle of least privilege.

16. The computer-implemented method of claim 1, wherein the metadata comprises one or more of:

permissions per application, security incidents representing historical data about security risks and unusual access activities, and/or permission request history indicating records of user requests for additional permissions.

17. A system, comprising:

one or more processors; and memory storing code comprising instructions, wherein the instructions, when executed, cause the one or more processors to:

receive metadata related to data access associated with a domain, the domain including a plurality of named entities;

determine domain-defined groups of the plurality of named entities, each domain-defined group is associated with a domain-defined access rule;

extract, from the metadata, features associated with the plurality of named entities, wherein at least one feature is associated with access activity data of the named entities accessing data resources associated with the domain;

input the features into a machine learning model to identify an automatically-generated access-control group that includes a set of one or more named entities;

determine an access control rule for the automatically-generated access-control group based on the access activity data of the set of one or more named entities;

compare the access control rule for the automatically-generated access-control group to a domain-defined access rule associated with a domain-defined grouping to which one of the named entities in the set belongs; and generate, based on comparing the access control rule to the domain-defined access rule, a recommendation on changing access privilege of one or more named entities in the set.

18. The system of claim 17, wherein the instructions, when executed, further cause the one or more processors to generate an access control graph from the metadata, the access control graph comprising graph objects, the graph objects comprising:

resource nodes representing data resources associated with the domain;

application account nodes representing application accounts associated with the domain; and access activity data associated with application accounts accessing the data resources, wherein at least one feature inputted into the machine learning model is extracted from the graph objects.

19. The system of claim 18, wherein determining the domain-defined groups comprises:

traversing the access control graph to determine a named entity grouping based on the application account nodes belonging to the named entity and the resource nodes accessed by the named entity.

20. A non-transitory computer-readable medium storing code comprising instructions, wherein, the instructions, when executed, cause one or more processors to:

receive metadata related to data access associated with a domain, the domain including a plurality of named entities;

determine domain-defined groups of the plurality of named entities, each domain-defined group is associated with a domain-defined access rule;

extract, from the metadata, features associated with the plurality of named entities, wherein at least one feature is associated with access activity data of the named entities accessing data resources associated with the domain;

input the features into a machine learning model to identify an automatically-generated access-control group that includes a set of one or more named entities;

determine an access control rule for the automatically-generated access-control group based on the access activity data of the set of one or more named entities;

compare the access control rule for the automatically-generated access-control group to a domain-defined access rule associated with a domain-defined grouping to which one of the named entities in the set belongs; and generate, based on comparing the access control rule to the domain-defined access rule, a recommendation on changing access privilege of one or more named entities in the set.

* * * * *